United States Patent
Moyano et al.

(10) Patent No.: US 7,187,671 B2
(45) Date of Patent: Mar. 6, 2007

(54) CIRCUIT SWITCHED PRIVATE COMMUNICATION NETWORK WITH INTEGRATED PACKET SWITCHED MULTIMEDIA EXTENSIONS

(75) Inventors: Parra Moyano, Madrid (ES); Arauz Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 968 days.

(21) Appl. No.: 10/203,087

(22) PCT Filed: Jan. 30, 2001

(86) PCT No.: PCT/EP01/00970

§ 371 (c)(1),
(2), (4) Date: Aug. 6, 2002

(87) PCT Pub. No.: WO01/60109

PCT Pub. Date: Aug. 16, 2001

(65) Prior Publication Data

US 2002/0191596 A1    Dec. 19, 2002

(30) Foreign Application Priority Data

Feb. 7, 2000   (DE) ................................ 100 05 282

(51) Int. Cl.
*H04L 12/66* (2006.01)
(52) U.S. Cl. ...................... 370/353; 370/401; 370/465
(58) Field of Classification Search ...................... None
See application file for complete search history.

(56) References Cited

U.S. PATENT DOCUMENTS

| | | | |
|---|---|---|---|
| 5,181,199 A | 1/1993 | Motoki et al. | |
| 5,524,137 A | 6/1996 | Rhee | |
| 5,949,756 A | 9/1999 | Kienberger et al. | |
| 6,026,086 A | 2/2000 | Lancelot et al. | |
| 6,343,074 B1 * | 1/2002 | Pickett | 370/353 |
| 6,430,174 B1 * | 8/2002 | Jennings et al. | 370/352 |

(Continued)

FOREIGN PATENT DOCUMENTS

DE    44 41 685 A1    6/1996

(Continued)

*Primary Examiner*—Hassan Kizou
*Assistant Examiner*—Brian Roberts
(74) *Attorney, Agent, or Firm*—Nixon & Vanderhye, P.C.

(57) ABSTRACT

A multimedia data network (MMN) operating according to a packet switched standard and a circuit switched network (TABX) are connected without a gateway (GW). The circuit switched network (PABX) comprises a multimedia controller (MMC) which receives signaling messages from multimedia terminals (MT) and controls the switching resources (SW) of the circuit switched network (PABX) on the basis of these signaling messages during a call set-up. The multimedia controller (MMC) makes the multimedia terminals (MT) normal extensions of the extension space of the circuit switched network (PABX). Therefore, multimedia terminals (MT) and normal telephony terminals (TT) can perform a data exchange through the switching resources (SW) controlled by the multimedia controller. Additionally, the multimedia controller (MMC) can provide supplementary services of the circuit switched network to the multimedia terminal (MT). It is also possible that the multimedia controller (MMC) performs a network resource management of resources in the multimedia data network (MMN). Thus, the multimedia controller (MMC) provides a full integration of the multimedia terminals (MT) into the circuit switched network without using the functionality of protocol conversion of a gateway (GW).

10 Claims, 20 Drawing Sheets

U.S. PATENT DOCUMENTS

| | | | |
|---|---|---|---|
| 6,459,697 B1* | 10/2002 | Neyman | 370/352 |
| 6,671,263 B1* | 12/2003 | Potter et al. | 370/261 |
| 6,819,665 B1* | 11/2004 | Pinard et al. | 370/352 |
| 6,934,282 B1* | 8/2005 | Yoon | 370/356 |
| 2002/0041591 A1* | 4/2002 | Hluchyj | 370/354 |
| 2002/0071532 A1* | 6/2002 | Bebko et al. | 379/90.01 |
| 2003/0095542 A1* | 5/2003 | Chang et al. | 370/352 |

FOREIGN PATENT DOCUMENTS

| | | |
|---|---|---|
| DE | 197 56 404 A1 | 7/1998 |
| WO | 98/23056 A | 5/1998 |

* cited by examiner

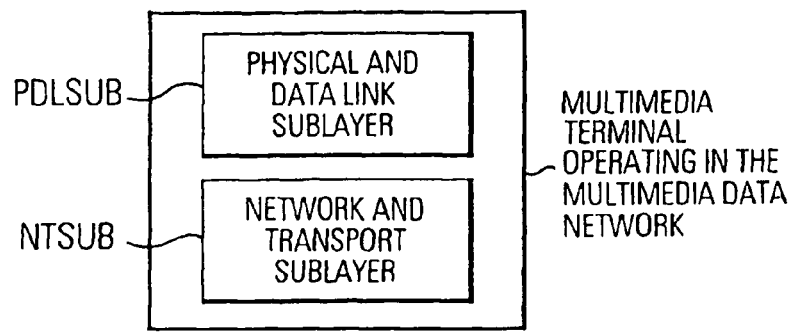
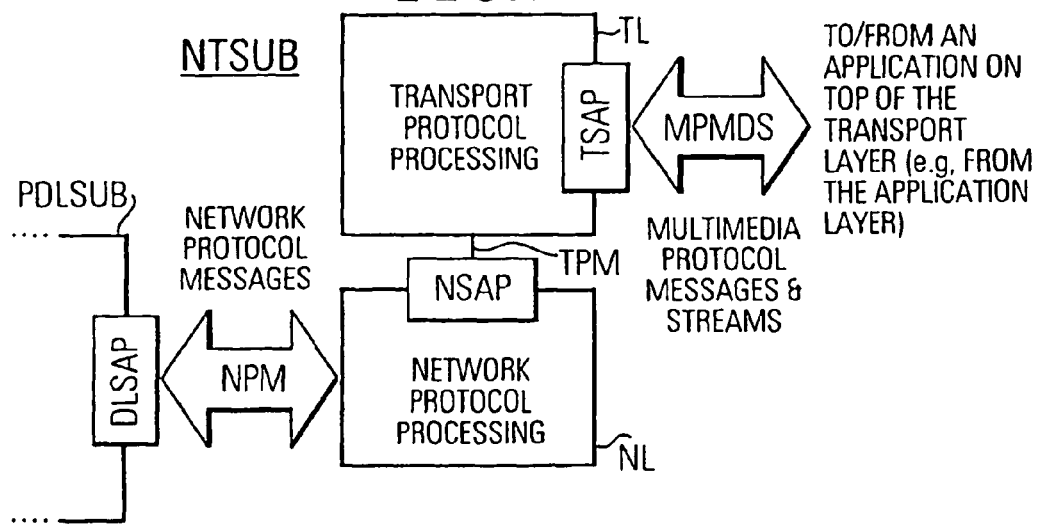
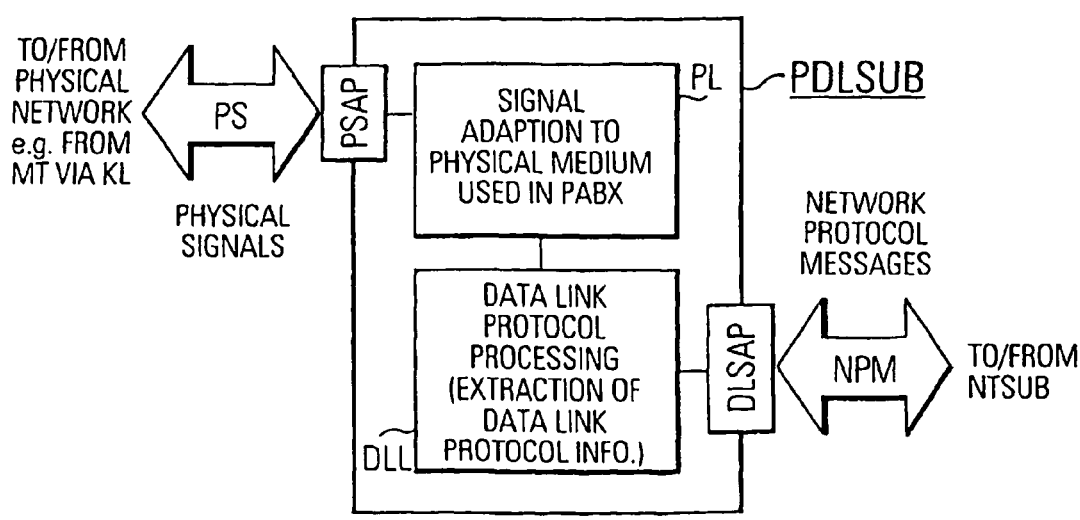

FIG.13b
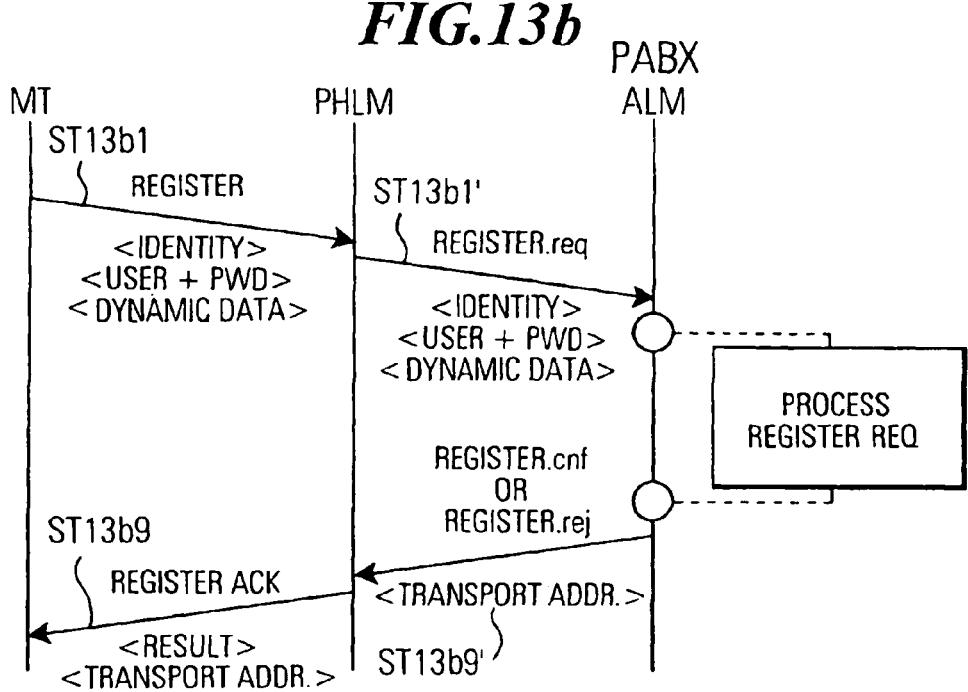
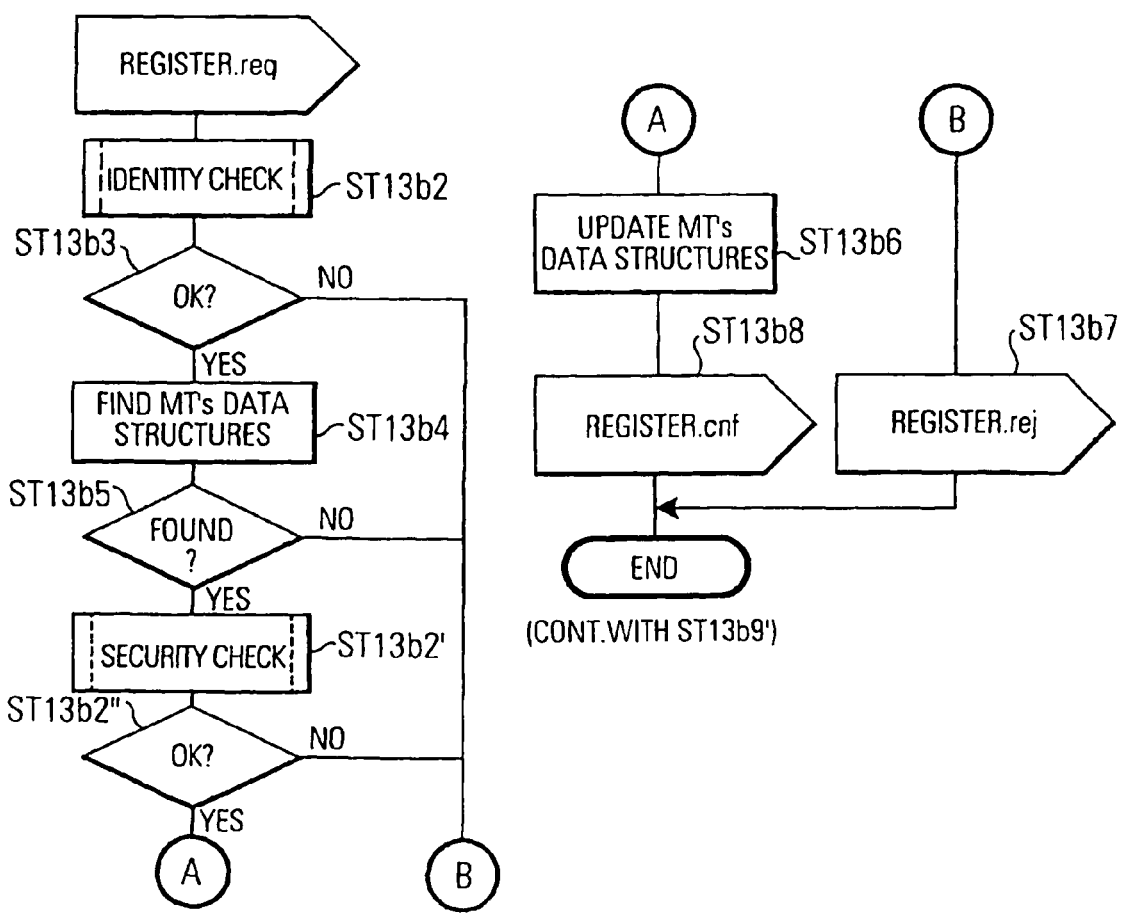

USE CASE ARCHITECTURE

USE CASE SIGNALLING DIAGRAMM, CONTINUED

CIRCUIT SWITCHED PRIVATE COMMUNICATION NETWORK WITH INTEGRATED PACKET SWITCHED MULTIMEDIA EXTENSIONS

This application is the U.S. national phase of international application PCT/EP01/00970 filed Jan. 30, 2001, which designated the U.S. and claims priority of DE 100 05 282.7 filed Feb. 7, 2000, the entire contents of each of which is hereby incorporated by reference.

FIELD OF THE INVENTION

The present invention relates to a circuit switched private communication network for providing communications between one or more first subscriber stations of the private communication network and one or more second subscriber stations of a packet switched private multimedia data network without using a gateway there between. The invention also relates to a method for providing communications between the circuit switched private communication network and the packet switched private multimedia data network.

In particular, the invention addresses the problem of how multimedia terminals of a multimedia data network can be made part of the extension space of a private circuit switched communication network, e.g. a private branch exchange system PABX. Therefore, the invention is generally directed to a PABX system with integrated multimedia extensions wherein data network infrastructure is used to make the multimedia terminals accessible and access the private network. More specifically, the gateway for converting the data communication from the telephony protocols used on the circuit switched network side to signaling and multimedia protocols used on the data network side should be avoided.

BACKGROUND OF THE INVENTION

The availability of voice over packet network technology and in particular, although not exclusively, corporate multimedia network, circuit switched and packet switched network technology has provided users with new services and functionalities which had not been available in the conventional telephony technologies. For example, the Internet or other private packet switched networks (multimedia data networks) or Internet-based multimedia communication technologies do not only offer advanced speech processing but also audio, video and/or other more advanced data communication services.

Due to the intrinsic packet switched nature, products for allowing the integration of these new Internet-based multimedia communication technologies with the older but more widespread and well-known traditional circuit switched telephony technologies are necessary. Since there is an exponential growth of the Internet and therefore of the multimedia data networks that support it, the number of potential customers for Internet-based multimedia communication systems increases every day. However, of course these customers still want to have access to the traditional circuit switched telephony systems, e.g. to a private branch exchange system PABX or generally to a circuit switched private communication network (PCN).

Each "world", namely the circuit switched technology and the packet switched technology, must be interfaced as regards the usage of their protocols for signaling and communication in order to allow a communication between these two apparently so different "worlds".

The two "worlds" are indeed completely different regarding the call set up and the call routing and other functionalities. Whilst in a circuit switched network PABX the first subscriber stations TT set up calls between each other by simply dialing the directory number whilst the switching means SW will connect the call, multimedia terminals MT being based on a packet switched technology operate completely differently. In a multimedia data network the multimedia terminals have transport addresses, identifications like an e-mail address, a URL, user name etc., an authentication (password) and have specific capabilities like audio, video, data, or multiconference functionalities. Conventionally, in a multimedia data network the multimedia terminals MT can have a "freeseating feature", e.g. they can be connected to the multimedia data network at arbitrary connectors. In the multimedia data network the multimedia terminals MT perform a registration procedure which makes them known within the multimedia data network. All such features are intrinsically different to the circuit-switched technology in traditional private branch exchange systems PABX.

PRIOR ART SOLUTIONS

FIG. 1 of the attached drawings shows a typical block diagram of a communication system where intercommunication between Internet-based multimedia communication systems and traditional telephony systems is possible. A circuit switched private communication network, i.e. a private branch exchange PABX, including a switching means (switching resources) SW and a multimedia data network (packet switched multimedia data network) each has first subscriber stations TT and second subscriber stations MT (TT: telephony terminal; MT: multimedia terminal). As is well known, typical protocols used for data communication within a multimedia data network comprise such protocols as H.323, SIP, TCP/IP, IPX and others. Typically, the controller within the multimedia data network serving a plurality of second subscriber stations MT is a gatekeeper GK schematically shown in FIG. 1. On the other hand, the traditional telephony system PABX being intrinsically of a circuit-switched nature uses such conventional protocols and communication techniques as defined in the signaling system 7 (SS7), ISDN or PCM modulation techniques.

Typically in 99% of all cases a gateway GW acts as an interface for converting the communications received from one side to the protocols or the signaling techniques available on the other side. Thus, the gateways convert from the signaling and media protocols used in the data network side to one or more telephone protocols used in the circuit-switched network side.

FIG. 1 only shows one example of the interconnection of the packet switched and circuit switched networks. Typically, in a corporate network it is quite common to connect the gateways providing intercommunication with multimedia data networks to the PABX of the company in order to provide a communication between the subscriber stations TT, MT of both systems.

Furthermore, there are systems where the gateway GW is not provided between the two networks PABX, MMN but where the gateway GW is actually incorporated as part of the branch exchange system PABX. However, the functionality is quite the same, namely to perform a protocol conversion between the differently used protocols.

U.S. Pat. No. 5,181,199 describes a packet switching system, more precisely a private branch exchange having a comparatively small number of ISDN circuits. In a circuit interface a table is provided for the purpose of conversion between a logical channel lying between ISDN terminal equipment and the private branch exchange and one lying between the private branch exchange and an ISDN network. The system is entirely based on circuit switching technology in which packets of the D channel contain signaling information and can be used for controlling the switching resources of the circuit switched system. The document only relates to providing circuit switched connections between individual ISDN terminals.

The preamble of claim 1 relates to a standard PABX comprising switching resources for providing communications between first subscriber stations belonging to the circuit switched extension realm of the system.

SUMMARY OF THE INVENTION

As explained above, whilst the multimedia terminals MT intrinsically independently of the specific type of multimedia data network MMN have some common features like the usage of a transport address, packet switched data communication, the identification etc., they can only be reached from the circuit switched network, e.g. a private branch exchange PABX, if they are interconnected by a gateway GW. That is, the multimedia terminals MT can communicate with the telephony terminals TT, however, whenever a new type of multimedia data network is to be connected there is the need to provide a new gateway GW which adds to the cost of the system. Furthermore, the solution is quite cumbersome, because the multimedia terminals MT can only be connected to connectors of the multimedia data network, i.e. they cannot—without the usage of a gateway—be plugged directly into a connector of the circuit-switched network PABX. That is, the multimedia terminals MT are not integrated into the circuit-switched network.

Therefore, the object of the present invention is to provide a circuit-switched private communication network for providing communications between its subscriber stations and multimedia subscriber stations of packet-switched networks without the usage of a gateway for establishing intercommunication. That is, the object of the present invention is to provide a complete integration between the traditional telephony system and the new Internet-based multimedia communication systems, in the scope of private and business communication networks. The invention is to provide a seamless integration of private communication networks based on circuit-switched equipment with private multimedia networks based on packet-switched equipment.

SOLUTION OF THE INVENTION

This object is solved by a circuit switched Private Communication Network system in accordance with claim 1.

According to one aspect of the invention the circuit-switched private communication network comprises a controller for controlling the use of the switching resources of the circuit-switched private communication network for setting up calls between the telephony terminals and/or the multimedia terminals on the basis of signaling information received at least from a second subscriber station (multimedia terminal) during a call set-up. That is, the controller according to the invention can interpret the signaling from the multimedia terminal and can control the switching resources in accordance with the interpreted content of the received signaling information. Since the controller can interpret at least the signaling information and since the circuit-switched private communication network is aware of the capabilities, categories, identities etc. of the multimedia terminals and is also aware of the kind of equipment it is connected to on the data network side, it can actually control the usage and seizure of switching resources in the circuit-switched private communication network without the use of a protocol conversion. However, if necessary even a gateway could be treated as one of the multimedia extensions of the circuit-switched network if it is previously registered in the controller.

Therefore, according to a second aspect of the invention any multimedia terminal undergoes a registration procedure in the controller of the inventive circuit-switched private communication network such that when a corresponding signaling information is received from a registered multimedia terminal the controller can act correspondingly.

Since the multimedia terminals are not invisible any more from the circuit-switched private communication network's point of view any telephony service available for PABX terminals will also be available for multimedia terminals. This also includes all services provided to PABX extensions but not accessible to external users connected to the PABX through public/private trunk lines.

Furthermore, all the logging and metering functions provided by the PABX are available for the multimedia terminals. According to the invention calls to/from the multimedia terminals are now regarded as normal internal calls in a circuit-switched network. Complete individual charging can be done for the multimedia terminals and detailed call information logging of the calls made and received by the multimedia terminals can be performed. Furthermore, advanced value added services can be provided to the multimedia terminals, like freeseating (making available the freeseating function already existing in the PABX also for the MT terminals) and access to the PABX messaging system.

Additionally, other advantages that deliver cost savings and improved performance are obtained with the invention here described. Such advantages are: it is now an easy task to keep the numbering space consistent, since there are not different number series initiated in each system (the PABX and the Gateway). All the Operations & Management functions provided by the PABX for its extensions is available for the MTs. MTs can be managed just as any other kind of PABX's extensions, instead of doing it from the Gateway, with the Gateway's own O&M interface and Management System. This means that only one instead of two different systems has to be managed. For the system that results from an implementation of the here described invention, the QoS measured in terms of unavailability is, at worst, the square root of that same QoS of the system composed of PABX and Gateway (assuming that unavailability (Gateway>unavailability(PABX)). This means that the service level offered by an implementation of the here described invention is much higher than that of a couple PABX plus Gateway.

According to the invention the controller does not perform a protocol adaption but intrinsically has a layer structure similar to the OSI (OSI: open system interconnection) structure necessary for extracting the signaling information from messages received from multimedia terminals. That is, according to the invention the physical signaling information received from multimedia terminals is processed in the layer structure of the controller in a similar manner as would be done e.g. in a gatekeeper of the multimedia data network. Thus, the input to the controller are physical signaling messages (signals) which are interpreted and the output of the controller directed to the switching means of the circuit-switched network are again physical signals adjusted in accordance with the interpreted content of the signaling information. Precisely for achieving this interpretation the controller according to the invention has a layer structure similar to the OSI layer structure conventionally provided in the multimedia data network. Therefore, there is not need to employ a gateway for performing a complete signal or protocol conversion.

Further advantageous embodiments and improvements of the invention can be taken from the dependent claims. Furthermore, it should be noted that on the basis of the teachings enclosed herein various modifications and variations of the invention can be carried out. In particular, the invention comprises embodiments consisting of features which have been separately described in the specification and/or claimed in the claims.

BRIEF DESCRIPTION OF THE DRAWINGS

FIG. 5 shows an example of the access layer part an OSI layer structure of a multimedia terminal operating in the multimedia data network according to the structure mapping of the present invention;

FIG. 6 shows a functional block diagram of the physical and data-link sub-layer means PDLSUB of the access layer means ALM (an access printed circuit board PCB) which provides the physical connection between the data network or a multimedia terminal and the private branch exchange;

FIG. 7 shows a functional block diagram of the network and transport sub-layer means NTSUB of the access layer means ALM implementing the communication between the network hardware HW and the application layer AL;

FIG. 13b shows a diagram of a registration signaling and a registration request message processing algorithm illustrating the registration procedure of the multimedia terminal MT in the circuit-switched network PABX, in particular the possibilities of the PABX to take a decision about admission or rejection of a multimedia terminal MT within the PABX extension space;

In the drawings the same or similar reference numerals denote the same or similar parts throughout.

Before coming to a detailed discussion of the invention it should be noted that in the description of the embodiments of the invention hereinafter special examples of signaling messages and protocols like H.323, SIP, TCP/IP, IPX, H.225.0, RAS, H.245, H.225.0/Q.931 and H.323 are described for illustrating the inventive concept. Furthermore, the operation of the inventive controller is described with reference to a layer model (similar as in the OSI structure). However, it should be noted that these descriptions are by no means limiting for the invention and similar functionalities and messages can be found in other multimedia data networks specifications.

Therefore, what has been described below is only what the inventors presently conceive as the best mode of the invention which should however not be taken as limiting the invention in any way.

PRINCIPLE OF THE INVENTION

Figure 2:
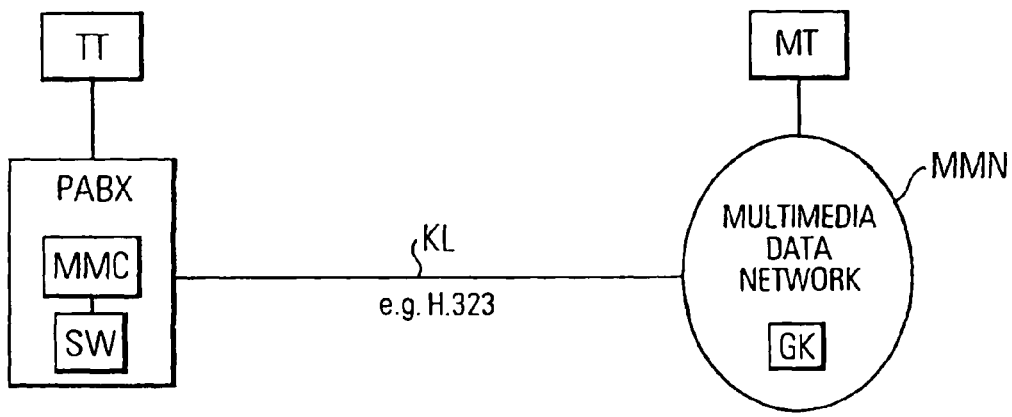
FIG. 2 shows a block diagram of a communication system where a multimedia data network is connected to a private branch exchange PABX without the use of a gateway GW whilst the PABX according to the invention comprises an inventive controller MMC (multimedia controller)
Figure 3:
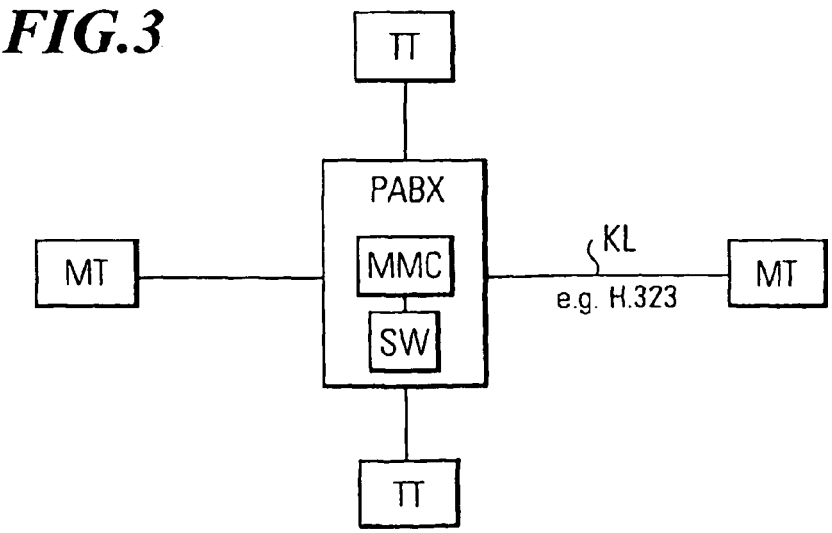
FIG. 3 shows a similar block diagram as in FIG. 2, where the multimedia terminals MT are directly plugged into the private branch exchange PABX.

Hereinafter, the principle of the invention will be described. FIG. 2 and FIG. 3 show the basic set-up of the communication system according to the invention. As shown in FIG. 2, the multimedia data network MMN has a plurality of second subscriber stations MT (hereinafter called multimedia terminals) and the multimedia data network MMN is connected via a communication connection KL using e.g. a H.323 protocol for signaling and data exchange to the circuit-switched private communication network PABX having one or more fist subscriber stations TT (hereinafter also referred to as the telephony terminals TT). The circuit-switched private communication network PABX comprises switching resources or a switching means SW for providing switching functionalities between the subscriber stations. As shown in FIG. 3, there is no actual need to go through the multimedia data network MMN itself because the multimedia terminals MT according to the invention can be directly connected to the circuit-switched network PABX.

According to the invention there is neither a gateway functionality between the networks in FIG. 2 nor is there a gateway incorporated in the circuit-switched network in FIG. 3. Instead, the PABX network comprises a controller MMC (hereinafter also referred to as a multimedia controller) which controls the use of switching resources SW of the circuit-switched private communication network PABX for setting up calls between said first and/or said second subscriber stations TT, MT on the basis of some interpreted signaling information received at least from the second subscriber station MT during a call set-up.

As explained before, the multimedia terminals MT operate according to a completely different packet-switched technology whilst the circuit-switched network PABX operates according to a circuit-switched technology. However, the multimedia controller MMC according to invention can understand the signaling information—which still has the packet network protocol format and—and it can decode this signaling information in order to control the seizure of switching resources in the private network PABX based on the interpreted content of the signaling information.

Of course, the multimedia controller can also receive signaling information from other entities in the communication network, e.g. from the telephony terminals TT in order to set-up a call to the multimedia terminal MT. However, the point of the present invention is that the controller will understand signaling information having a completely different (packet-switched network) format and that there is no need to provide a gateway for a protocol conversion as in FIG. 1.

This understanding of the signaling information from the multimedia terminal MT requires that the multimedia terminal MT is part of the PABX extension space and that the controller at least partly reflects the OSI layer structure of the protocol used in the data network to which the multimedia terminal MT belongs. This recognition or registration of multimedia terminals MT which is a prerequisite for carrying out the invention will be explained below with further details referring to the embodiments of the invention.

Due to registration and discovery procedures according to the invention the multimedia terminals MT are not "invisible" any longer from the controller's or PABX's point of view. The PABX can decode the signaling information because it is now aware of the capabilities, categories, identities etc. of the (registered) multimedia terminals MT. The PABX is also aware of the kind of equipment it is connected to on the data network side (a gateway, a multimedia terminal MT, a multi-conference unit MCU etc.). Thus, multimedia terminals can be managed just as any other kind of PABX extension instead of using a gateway. This means, that only one instead of two different systems must be managed in a unified manner.

It should also be noted that the multimedia controller according to the invention comprises a general set-up of layer means (realized in hardware or software) which are so generic that they allow to provide communications with any type of multimedia terminal using different protocols as long as some of the entities in the layer means are adapted to these protocols. This will be explained hereinafter.

First Embodiment (Controller Layer Architecture)

The multimedia controller MMC shown in FIGS. 2, 3 according to the invention allows to make the multimedia terminals MT an integral part of the PABX's extension space. That is, from the PABX's point of view the multimedia terminals MT are a type of extension just like the telephony terminals TT. In order to do so the multimedia controller MMC has some special functionalities which are expressed in a 5-layer architecture. Essentially this layer architecture of the controller transforms the PABX into an integrated multimedia communication system. By doing so, it not only gets rid of the usage of gateways GW (which can however be again considered as normal extension of the PABX) but it also allows to offer new functionalities and supplementary services to the multimedia terminals MT from the circuit-switched network PABX which have so far not been available for the multimedia terminals MT.

Figure 4:
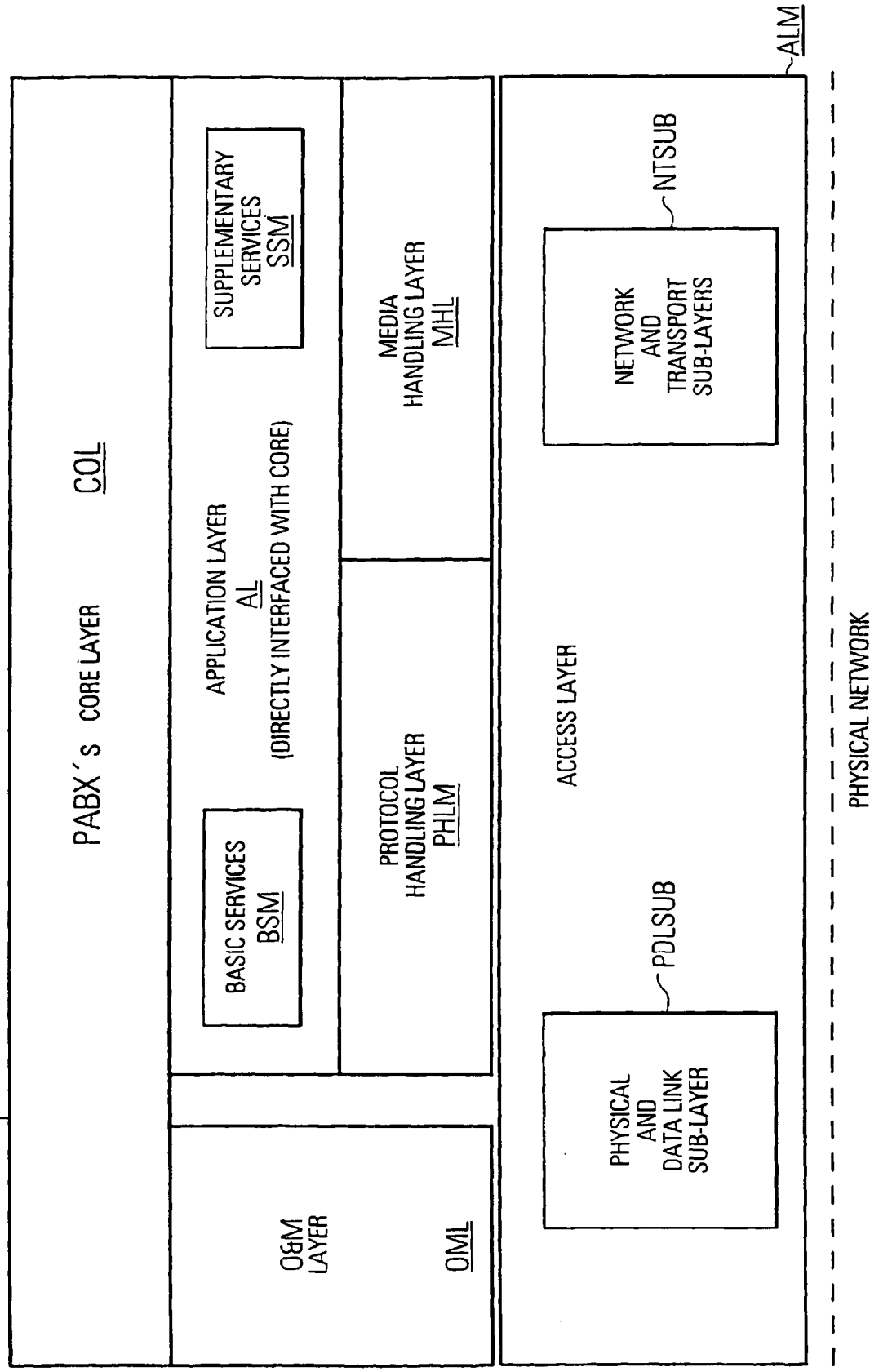
FIG. 4 shows a block diagram of the multimedia controller MMC according to the invention in terms of a layer structure.

As shown in FIG. 4 the multimedia controller MMC layer structure mirrors partly a layer structure as used in some of the protocols available in the multimedia data networks. It should be noted that here no references to the OSI model are made. The OSI model is a framework which can be followed or not by implementations and in the present invention a layer structure is used but not one which directly follows OSI. The Access layer matches layers 1 to 4 of the OSI model, but the similarities end up there. Concretely, there are no session and presentation layers, and the Application layer described here according to the invention is quite far away from the OSI model's concept of "Application layer".

Figure 1:
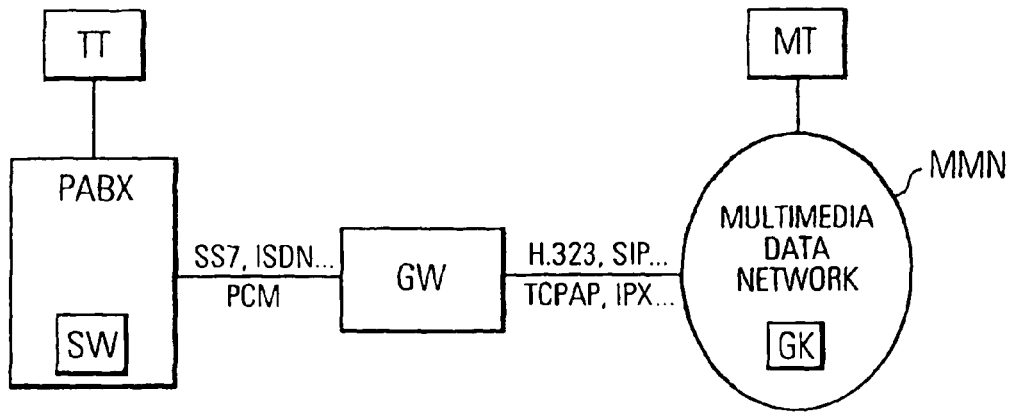
FIG. 1 basically illustrates the layout of conventional solutions for providing an intercommunication between a circuit-switched network and a packet-switched network using a gateway GW for protocol conversion.

In particular, an access layer means ALM comprises a physical and data link sub-layer PDLSUB and a network and transport sub-layer NTSUB. In addition to the access layer means ALM there is protocol handling layer means PHLM, a media handling layer means MHL, an application layer AL comprising basic services BSM and supplementary services SSM, an operation and maintenance layer means OML and the PABX's core layer COL essentially comprising the physical switching resources SW as shown in FIGS. 1–3. At the very bottom in FIG. 4 the physical data network connection, e.g. through the communication link KL is shown.

These layers and special procedures as described hereinafter are necessary to make the multimedia terminal MT a real extension of the PABX's extension space. Thus a complete seamless integration of the multimedia terminals MT of any kind into the PABX is possible.

It should be noted that in the description of the layer architecture hereinafter the layer designations are selected to correspond to some of the well-known expressions used in other protocols. However, these expression should not be limited to the specific layers in these protocols and corresponding functionalities can be identified in other protocols not specifically listed here.

Access Layer

The access layer means ALM of the multimedia controller MMC is necessary to interconnect the data network MMN (or respectively the multimedia terminal MT) and the multimedia controller MMC. As shown in FIG. 5, typically a multimedia terminal MT operating in the multimedia network or in fact the multimedia data network itself operates according to a data network protocol stack consisting of a physical and data link sub-layer PDLSUB and a network and transport sub-layer NTSUB. In order to allow the multimedia terminals MT of the data network to set-up data connections in the PABX the multimedia controller MMC of the PABX must mirror such a data network protocol stack of the access layer in the multimedia data network. Therefore, using the OSI layer implementation (OSI: open system interconnection) the access layer means ALM of the multimedia controller MMC according to the invention must implement these two sub-layers PDLSUB, NTSUB.

In the access layer all data network related issues are contained such that no changes to the upper two layers OML, PHLM, MHL; AL, BSM, SSM are necessary even if for example a TCP/IP adapted access layer would be replaced by an IPX access layer because the multimedia terminals MT to be integrated are operating according the IPX protocol. However, as will be seen below, even the generic access layer devices do not operate as if they were a gateway. That is, although some type of conversion and adaption is necessary in the access layer ALM, the access layer is only provided to attract, interpret and decode the signaling messages of the respective protocols. Therefore, by no means can the access layer be compared with the functionality of a gateway.

Physical and Data Link Sub-layer

FIG. 6 shows a functional block diagram of the physical and data link sub-layer PDLSUB. Such a device can advantageously be realized in hardware as an additional access printed circuit board (PCB). The PDLSUB device is provided for extracting from the physical signals PS received from the physical network, e.g. from the multimedia terminal MT or from the data network itself, the (signaling) network protocol messages NPM. The access device PDLSUB operates bi-directionally, i.e. it can also receive network protocol messages NPM and convert them back to physical signals to be provided to the data network and the multimedia terminal MT, respectively.

More specifically, the access device PDLSUB comprises a physical service access point PSAP for receiving from the physical network the physical signals PS and for decoding these signals. An adaption means PL converts these decoded physical signals into bit-frames and a data link protocol processing means DLL then extracts the additional information belonging to the data link protocol from the bit frames received from the PL device and thus provides the network layer protocol messages NPM through a data link service access point DLSAP to the network and transport sub-layer means NTSUB as shown in FIG. 6.

In the opposite direction, the PDLSUB means receives network protocol messages NPM through the DLSAP from the entity connected to it, then puts this message into a data link protocol bit frame adding the data link protocol additional information and then the bit frame is encoded in the PL device in an electrical signal put onto the physical data network through the physical service access point PSAP.

An example should illustrate the functionality of the PLDSUB part of the access board ALM. If the multimedia terminal MT or the data network operates according to a TCP/IP protocol (i.e. the data network is a TCP/IP network) then the encoding/decoding of bit frames in the PL device is performed according to the IEEE 802.3 standard (Ethernet) whereas the data link protocol processing device DLL for extracting/inserting the additional information belonging to the data link protocol would be implemented in accordance with the IEEE 802.2 standard (HDLC: High Definition Link compatibility).

Similarly, if the PABX controller wants to be connected to an ATM data network, the PL device would be a wavelength division multiplexing device (PDM) and the DLL device would operate according to the ATM specifications (ATM: Asynchronous Transmission Mode).

Therefore, whenever a different type of data network is to be integrated, only the PL and DLL devices need to be appropriately adapted in order to extract from the received physical signals PS the respective network protocol messages NPM. It is also possible that the PDLSUB means comprises a plurality of PL devices and DLL devices which are respectively selected in accordance with the specific type of multimedia terminal and data network connected to the PABX system. Such selection can be performed manually or automatically by recognizing the type of multimedia terminal or data network connected to the PABX network.

Network and Transport Sub-layers

Another device which requires an adaption depending on the type of multimedia terminal or a data network specification is the network transport sub-layer means NTSUB of the access layer means ALM. FIG. 7 shows a functional block diagram of this NTSUB layer means. The functionalities in FIG. 7 can be realized by a hardware printed circuit board or corresponding functionalities realized in software. Essentially the network and transport sub-layers NTSUB are provided to convert the network protocol messages NPM from the physical and data link sub-layer PDLSUB into the multimedia protocol messages NPM data streams in a bi-directional manner.

Essentially, the network layer of the NTSUB means is constituted by a network protocol processing device NL which deals with the delivery of packets from endpoint to endpoint through the underlying network. It can also perform control functions of the network status, congestion control, etc. The network protocol processing device NL can for example be implemented in accordance with the Internet Protocol (IP).

The transport layer part TL of the NTSUB means adds reliability in the delivery and fragmentation of messages. Optionally, it can also include access management, security functions etc. For example, the transport protocol processing device TL can be implemented in accordance with the Transmission Control Protocol (TCP) in its standard and secured version.

Multimedia protocol messages and data streams MPMDS received from an application on top of the transport layer (e.g. from the protocol handling layer means PHLM) through a transport service access point TSAP are embedded into a Transport Protocol message TPM which is sent to the network layer device NL through a network service access point NSAP. The network protocol processing means NL embeds this transport protocol message TPM into a network protocol message NPM which is sent through the data link service access point DLSAP to the physical and data link sub-layer PDLSUB as shown in FIG. 6. Since the NTSUB device is bi-directional, in the other direction network messages NPM are stripped off the network and transport protocol additional information in their way to their application. Thus, the output of the NTSUB means in the upward direction are multimedia protocol (signaling) messages and (data) streams extracted from the network protocol messages NPM.

For example, if the PABX wants to be connected to a data network operating in accordance with the TCP/IP protocol, the network layer device NL must be implemented in accordance with the Internet protocol IP and the transport protocol processing means TL must be implemented in accordance with the TCP protocol. The transport service access points TSAP acting as kind of "sockets" or "interfaces" are implemented in accordance with the TCP API (TCP API: Transmission Control Protocol Applications Programmer Interface).

As another example, if the PABX controller wants to be connected to a Novell Netware data network, the network and transport layer NTSUB; NL, TL functions are both implemented in accordance with the IPX protocol.

By implementing the two devices NTSUB, PDLSUB the physical signals received from the data network are processed in order to extract the multimedia protocol (signaling) messages and data streams of the communication received from the multimedia terminal MT and the data network. As was the case in the PDLSUB means, also in the NTSUB device the TL and LL means can be provided several times in order to allow an automatic or manual adaption to data networks of different protocols.

Therefore, one can say that the access layer means ALM of the inventive multimedia controller MMC does not perform a protocol adaption as does a gateway, but it provides the multimedia protocol messages and the data streams of the communication received from the physical connection and it does so in a bi-directional way. The multimedia protocol messages and data stream messages MPMDS are the messages which are then used in the two upper layers PHLM, MHL, AL as will explained below. Such extraction/insertion of messages MPMDS is necessary in order to allow the multimedia controller MMC to interpret signaling messages in order to control the switching means SM (and to allow the registration, discovery and call set-up procedures).

Since the multimedia protocol and data stream messages MPMDS are used some detailed explanation of these messages are made hereinafter. In Telephony over Data Networks, in order to get a complete communication between terminals, there are two main information sets that must be distinguished:

1. Signaling. This includes the messages exchanged between peers in order to set-up and tear down calls, invocation and execution of supplementary services, and any other function supported by the protocol to which these messages belong. In signaling, two main areas can be distinguished: 1a. Call Signaling. This includes messages related exclusively to call-related functions, like e.g. setting up a call, reporting that the called party is ringing etc. 1b. Other signaling. This includes messages not directly related to call functions. Examples of this might be registration messages, location messages (messages used to guess where a given party is located) etc. The signaling is characterized by its discrete nature (one bunch of octets every n seconds, with n being a random variable which range is, in principle, unlimited).

2. Media. This includes the information which is the object of the communication, i.e. the information that actually wants to be exchanged by the users. The signaling is an accessory part of the communication necessary for a right interworking between the physical devices. When this information includes information generated by intrinsically-continuous information sources like audio and/or video sources, the transfer of this information between parties takes the form of a more-or-less constant flow of packets through the network, and is therefore sometimes called "stream".

Therefore a "media stream", "multimedia stream" or "multimedia data stream" as mentioned above refers to the information which is generated by and exchanged between the users and which is the object of the communication process. Thus, the aforementioned "multimedia protocol messages" constitute the signaling part of the multimedia protocol being used, whilst "data stream messages" constitute the media part of said multimedia protocol.

Protocol Handling Layer

The protocol handling layer means PHLM resides on top of the access layer means ALM. The protocol handling PHLM takes care of all processes related to the Multimedia Protocol which is being used for the multimedia communication.

By isolating the multimedia protocol handling functions in a separate layer the rest of the layers are made independent of the multimedia protocol used. This means, that an H.323 protocol handling layer means can be replaced by a SIP protocol handling layer using the same access and application layers. The protocol handling layer functionalities can be again realized in hardware or software blocks.

Figure 8:
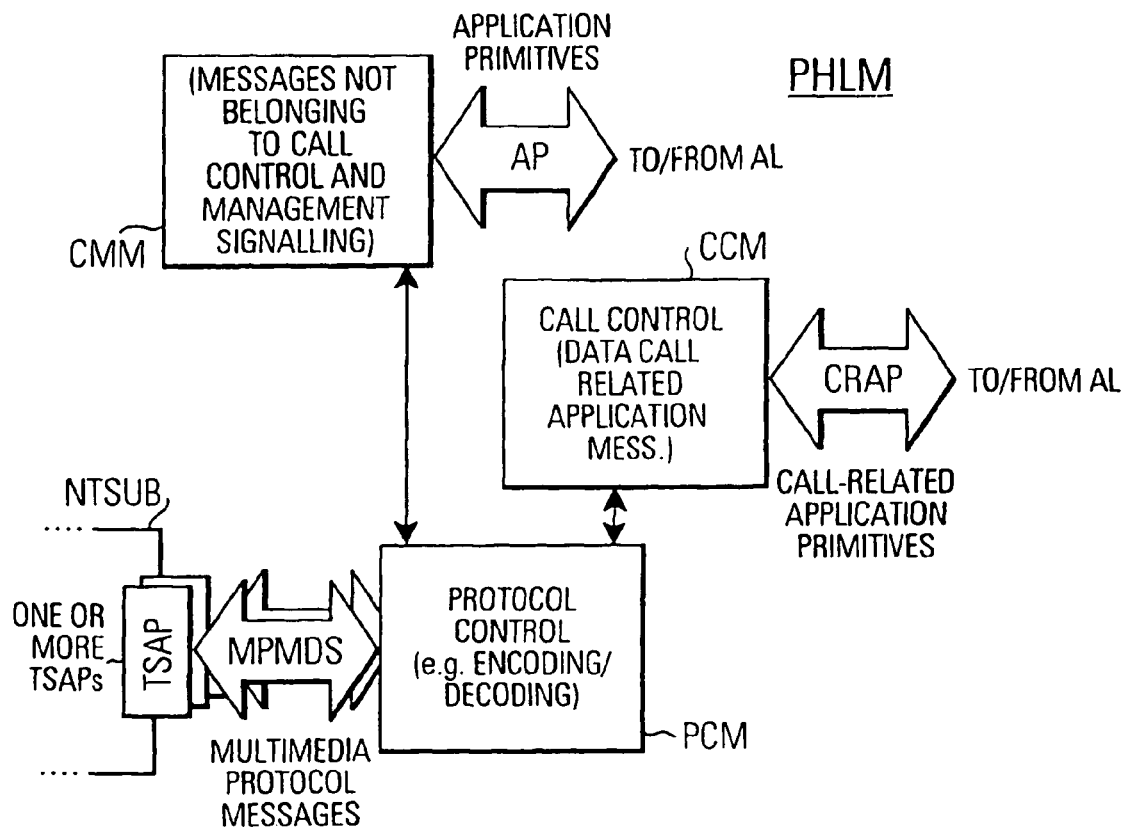
FIG. 8 shows a functional block diagram of the protocol handling layer means PHM taking care of uniform syntax and semantics of the messages of the multimedia protocol being used.

As shown in the functional block diagram of FIG. 8, the protocol handling layer means PHLM comprises three different devices, namely a protocol device PCM, a control and management device CMM and a call control device CCM. Through the transport service access point TSAP of the NTSUB sub-layer (FIG. 7) it receives the multimedia protocol messages & data stream messages MPMDS and forms the application primitives AP and the call-related application primitives CRAP therefrom in a bi-directional manner. The AP primitives and CRAP primitives are respectively provided to the application layer AL.

In a more generic way, one can understand the significance of the application primitives AP and the call-related application primitives CRAP by considering the actual purpose of the protocol handling layer. The Protocol Handling layer is in charge of checking the correctness of the sent and received multimedia protocol messages, and of the mapping to/from Application primitives and multimedia protocol messages. Therefore it does not send or receive any information belonging to the media part of the protocol. This information is only processed by the Media Handling Layer (in a similar way, the Media Handling layer will never send, receive nor process a Multimedia protocol message. It only handles media streams, i.e. continuous flows of packets carrying information generated by the users of the communications system).

For example, if a party places a call to another party, at a given moment, the Protocol Control block PCM receives a Multimedia protocol message from its underlying Transport layer. The Protocol Control block will decode the message, check that the information contained in it is correct according to the protocol specification, and handle the message up to the Call Control block CCM (since the Protocol control block finds out that this is a call set-up message, therefore call-related). The Call Control CCM block will then invoke an Application primitive that might be called "receiveCall (E.164 number)". The Application layer then will execute the procedures in it contained for handling the reception of a new call from a remote party.

Thus, the protocol control device PCM performs an encoding/decoding of the multimedia protocol messages MPMDS and controls/checks the correctness of these messages in accordance with the multimedia protocol specification.

On the other hand, the control and management device CMM processes all messages from the protocol control device PCM which are not directly belonging to the call signaling part of the multimedia protocol (messages). For example, the control and management device CMM processes the discovery and registration messages of the discovery and registration processes shown in FIGS. 13a, 13b and 13c to be explained below. It also processes the messages for address translation, resource management and any other service which the PABX provides to the multimedia terminal MT. Thus, the output of the control and management device CMM are the application primitives AP which are control messages output to AL. That is, the Application primitives generated by the Control and Management block are delivered to the Application layer AL the same as those primitives generated by the Call Control block.

On the other hand, the call control device CCM maps call-related application primitives CRAP to call signaling messages of the multimedia protocol and vice versa. Thus, the call-related application primitives CRAP are a reflection of the actual call signaling messages received/transmitted to/from the multimedia terminal MT and the data network, respectively. The call control device CCM also checks the correctness of the received messages or the correctness of the invoked primitive against the call status, according to the multimedia protocol specification. That is, the Application primitives generated by the Control and Management block are delivered to the Application layer AL the same as those primitives generated by the Call Control block.

As indicated in FIG. 8, the protocol control device PCM can preferably be connected to several transport service access points TSAP, for example in case that the call signaling messages and the non-call signaling messages of the multi media protocol use different transport service access points TSAP.

For example, if the multimedia protocol used by the multimedia terminals MT and the data network, respectively, is the H.323 protocol, the protocol control device PCM is implemented as a PER encoder/decoder, the control and management device CMM is an implementation of the H.225.0 RAS protocol of a H.323 gatekeeper GK and the call control block CCM is an implementation of the H.225.0/ Q.931 & H.245 protocol of the H.323 gatekeeper. As explained before, if the multimedia controller MMC is to operate in accordance with a plurality of different data network protocols, several different control devices PCM, CMM and CCM can be provided and can be selected (manually or automatically) depending on the type of multimedia protocol used in the data network.

Media Handling Layer

Figure 9A:
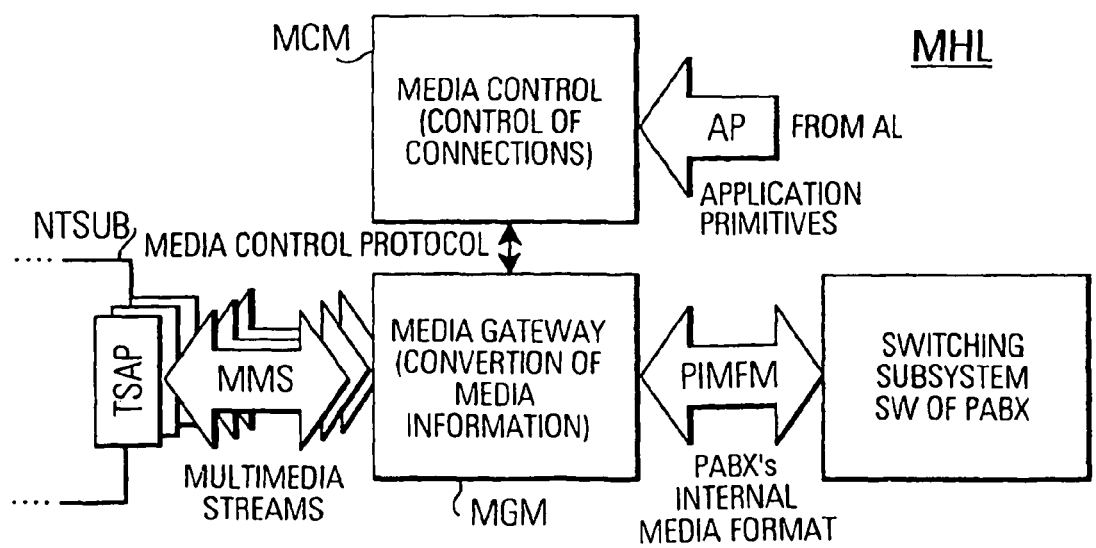
FIG. 9a shows a functional block diagram of the media handling layer means MHL allowing the transcoding, packetization and framing of real-time information streams.

In the context of a layer structure, the media handling layer device MHL is on top the access layer ALM and is therefore at the same level as the protocol handling layer means PHLM. The media handling layer device MHL processes all messages related to the handling of connections for multimedia transmissions between multimedia terminals MT and the PABX network. It is important to keep this layer as isolated as possible from the protocol handling layer MHL which thus allows the handling of calls which do not use the switching resources of the PABX. As shown in FIG. 9a, the media handling layer means MHL receives through one or more transport service access points TSAP from the network and transport layer device NTSUB the multimedia streams MMS of the multimedia protocol messages & data stream messages MPMDS. MHL also receives application primitives AP from the application layer AL which previously received another related primitive from the protocol handling layer means PHLM.

For example, the protocol message triggers the sending of a primitive from PHLM to the Application Layer, and then the Application Layer sends the actions (such as transmission of data stream for which a protocol message is treated by PHLM).

On the basis of these messages MMS, AP the media handling layer means MHL directly interfaces with the PABX switching sub-system SW by outputting messages PIMFM having the PABX's internal media format. Thus, on the basis of the control application primitives AP the actual converted multimedia data streams MMS are provided to the switching sub-system SW.

As shown in FIG. 9a, the media handling layer MHL comprises a media gateway device MGM and media control device MCM.

The media gateway device MGM converts the actual multimedia data information messages MMS between the format used in the multimedia protocol being supported and the internal PABX's switching sub-system format. The media gateway device MGM can be implemented by means of hardware or software. If implemented in hardware, a PCB (PCB: Printed Circuit Board) is added to the PABX which implements all the necessary elements for transferring/ converting the multimedia information messages MMS between the data network and the PABX's switching sub-system SW.

Figure 9B:
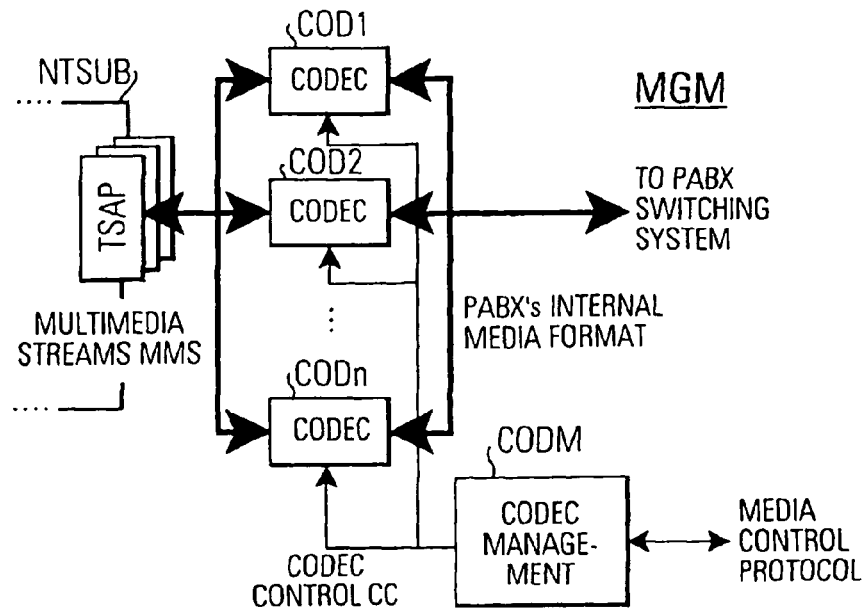
FIG. 9b shows a functional block diagram of the media gateway means MGM shown in FIG. 9a responsible for the transcoding of real-time information streams.

FIG. 9b shows an embodiment of the media gateway device MGM which comprises a plurality of coders COD1, COD2 . . . CODn which are controlled with coder control messages CC from a coder management device CODM. The coder management device CODM operates on the media control protocol. The coder management device CODM is part of the media control device MCM. The Codecs COD1, COD2 . . . CODn encode/decode information streams. For example, the audio codec encodes/decodes an audio stream (i.e. a continuous flow of audio samples) using a given coding format. For instance, the voice in PCM links is coded according to the ITU-T standard G.711. In H.323, the voice might be encoded according to many different standards like G.723, G.729 etc. To convert between G.711 and e.g. G.723 a codec is necessary. On the other hand, TDM switches as those used in PABXs use the G.711 format. Therefore, to input a voice stream encoded according to e.g. G.723 to the PABX switch, a codec must first convert the voice samples from the G.723 coding scheme to the G.711 coding scheme. The Codecs must be controlled by some device which configure the input and output coding scheme and order the codec to start coding/decoding. This is the function of the Codec Management block CODM.

Furthermore, the media control device MCM in FIG. 9a receives application primitives AP sent from the application layer as a response to a primitive received at the application layer from the protocol handling layer means PHLM shown in the FIG. 8. The media control device MCM uses these application primitives (control signals) AP for setting and tearing down connections between the transport service access point TSAP and the PABX's switching sub-systems SW and controls the media gateway device MGM to do whatever is appropriate by means of the media control protocol. The media control device MCM can have control of one or more media gateway devices MGM. Basically the Media Gateway MGM converts to/from different coding schemes as ordered by the Media Control block MCM. The Media Control protocol MCM is the protocol understood by the Media Gateway MGU and the Media Control blocks MCU, and is composed of primitives like "connect codec to TSAP xxx . . . ", "disconnect codec", and "start converting from G.711 to G.723".

For example, if the multimedia data network MMN uses a TCP/IP network for transport then the media gateway device MGM must be an implementation of the RTP/RTCP protocols (RTP: Real Time Protocol; RTCP: Real Time Control Protocol) and it must contain a transcoding device which converts between the coding standards used on the RTP side (e.g. H.261+G.729) and the PCM coding (G.711) used internally in the PABX switching sub-system SW. Summarizing, one can say that the PHLM cannot control the MHL, and therefore the MHL will never receive any primitive from the PHL. The layer which sends primitives to the MHL in order to set up transcoding paths in this MHL is the Application layer.

Application Layer AL

Figure 10:
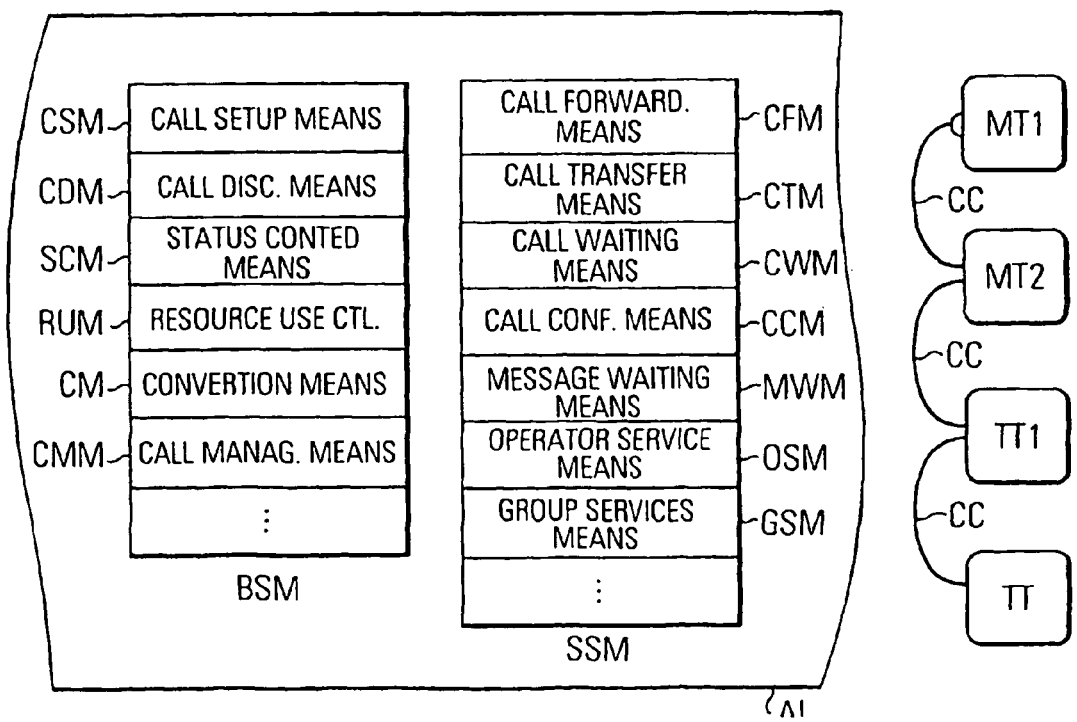
FIG. 10 shows a functional block diagram of the basic services means DSM and the supplementary services means SSM of the application layer AL which directly interfaces with the PABX's core layer COL.

This layer is in a layer context in control of the underlying layers PHLM, MHL and AL. It has direct interfaces with the control blocks in the PABX switching means in order to get interworking between a telephony terminal TT and multimedia terminals MT and manages the interworking between two and more multi media terminals MT. As indicated in FIG. 4, the application layer device AL comprises a basic services device BSM and a supplementary services device SSM which are respectively shown in FIG. 10 and FIG. 11.

The basic services device BSM comprises a call set-up means CSM for setting up calls (media+signaling connections) between multimedia terminals MT and telephony terminals TT, no matter what their types are. A call disconnection means CDM is responsible for tearing down calls (media+signaling connections) previously set up between terminals, no matter what their types are (MT or TT). A status control means SCM controls the status of calls in order to ensure that an end-to-end communication is held when the physical resources of the switching means SW allow this. A resource use control means RUM manages the data network resource utilization by multimedia terminals MT. A conversion means CM performs a translation between the multimedia terminal's addresses (e-mail address, URL address, etc.) and the telephony terminal's addresses (e.g. E.164 addresses).

Figure 12:
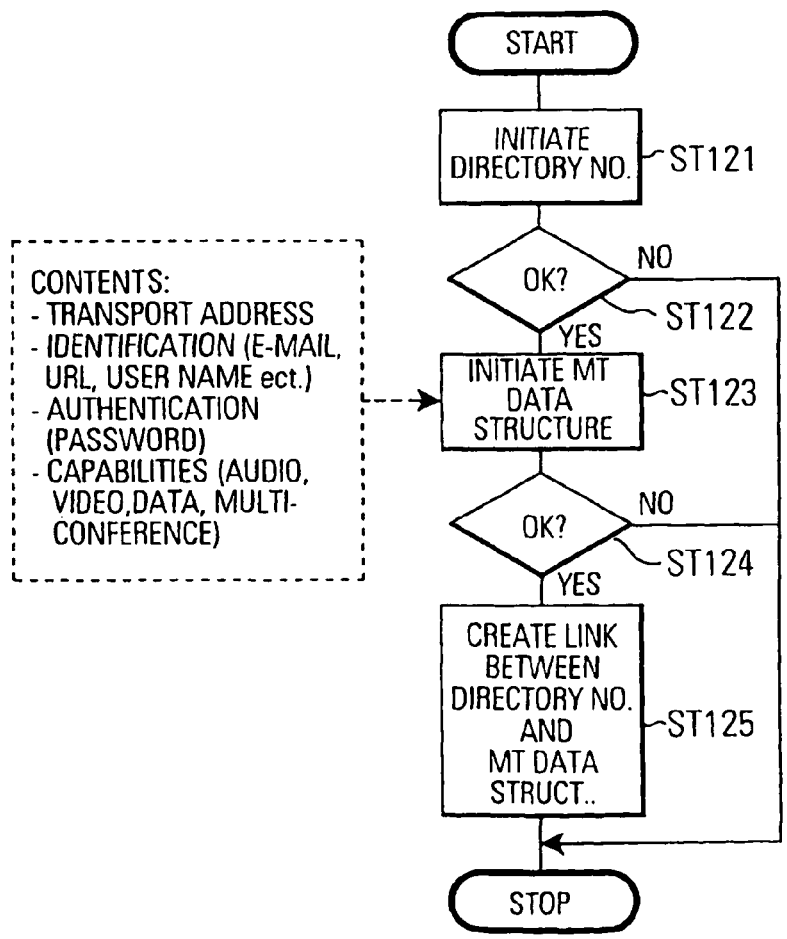
FIG. 12 shows a flow chart for making a multimedia terminal MT part of the PABX extension space, i.e. for integrating the multimedia terminal MT in a seamless manner into the circuit-switched private communication network.
Figure 13A:
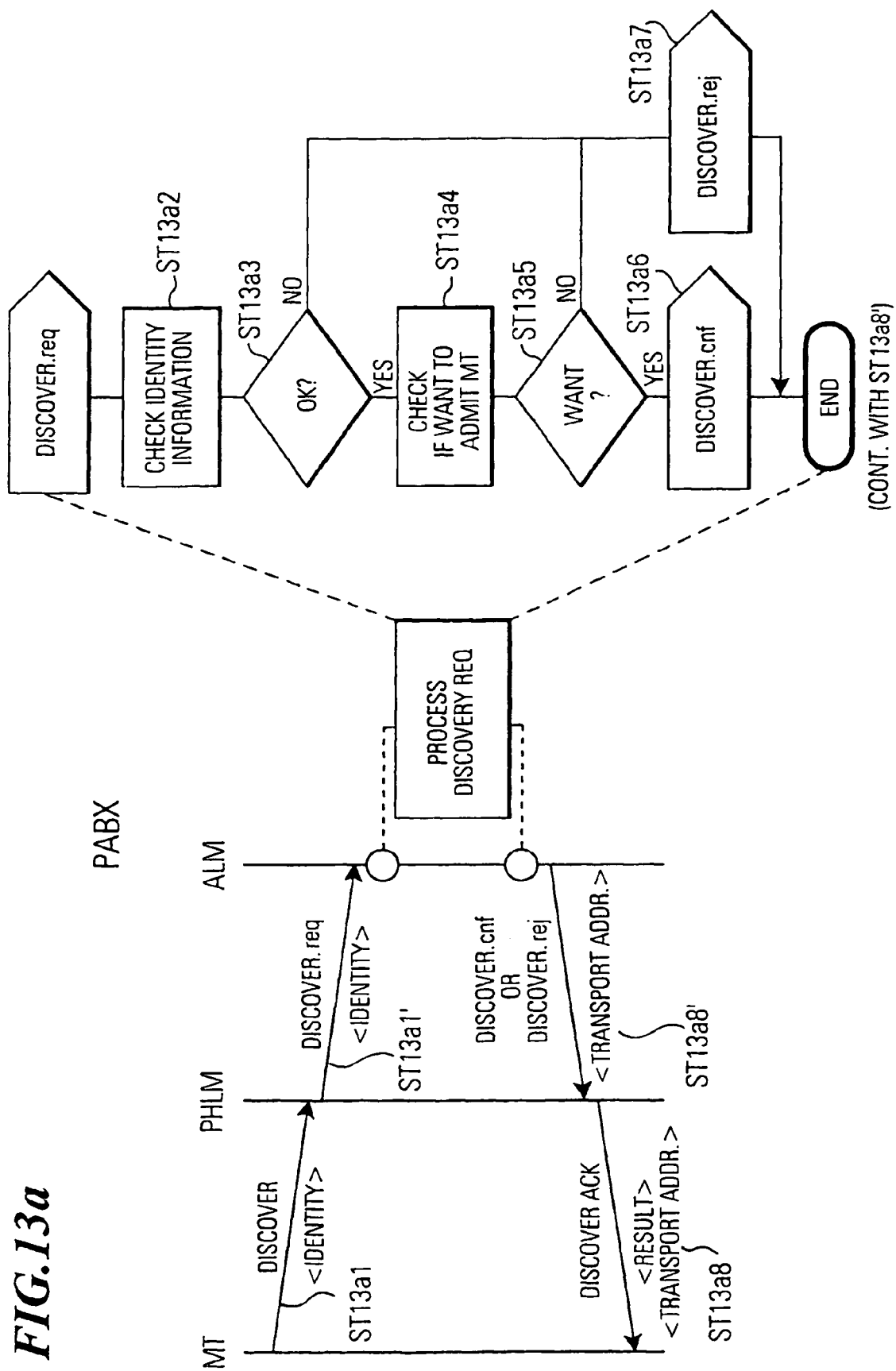
FIG. 13a shows a diagram of a discovery signaling and a discovery request message processing algorithm which allow the circuit-switched private communication network to reveal itself to a given multimedia terminal.
Figure 13C:
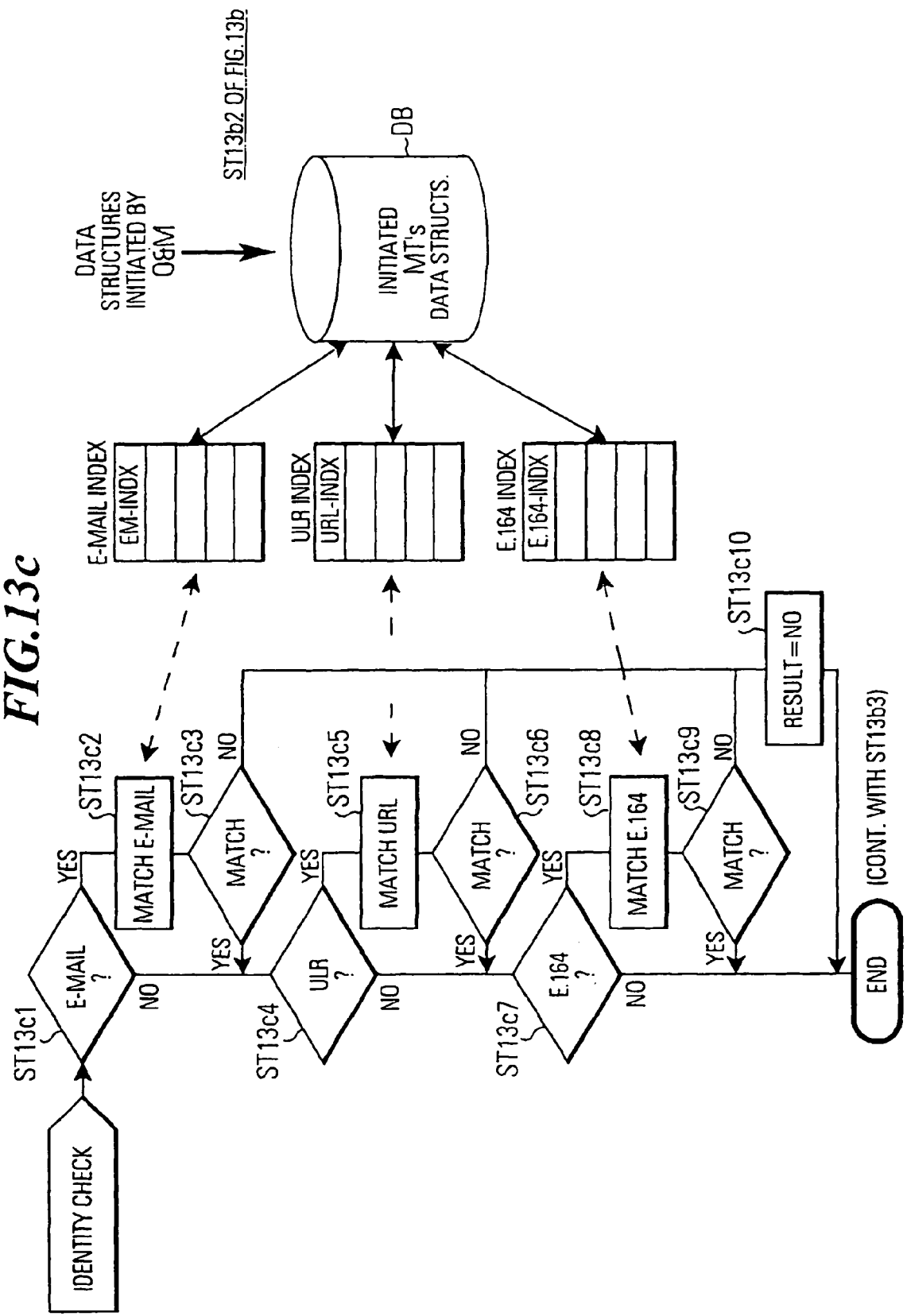
FIG. 13c shows a flow chart of an identity check procedure (carried out in step ST13b 2 in FIG. 13b), which allows PABX to check the identity of a multimedia terminal MT, in particular checking the e-mail address, the ULR and the E.164 directory number.

Whilst the conversion means CM is for example not used in the flow chart in FIG. 12, indeed in FIGS. 13a, 13b, 13c it is used. That is, the flowchart in FIG. 12 (which, by the way is different from the rest of diagrams since this one illustrates a manual process that must be done by an Administrator or some kind of Management entity external to the system) actually the relationship between E:164 numbers and other identities like e-mail, URL, TA etc. is created. However, the CM is used in flowcharts in FIGS. 13a and 13b. In FIG. 13c, the CM itself is illustrated. It is the database on the right side of the figure. The flowchart on the left side is used for checking that the identity provided by the MT is correct by accessing the data in this CM. This will be explained below with more details.

Finally, a call management means CMM performs the call management through the use of facilities such as call information logging, traffic management, call authorization/restriction, etc.

The supplementary services device SSM implements additional, value-added function related to calls. The list of these functions is virtually endless. Additional telephony supplementary services are preferably included in this device SSM. For example, the SSM device can comprise a call forwarding means CFM for call forwarding processing, a call transfer means CTM for call transfer processing, a call waiting means CWM for call waiting processing, a call conference means CCM for conference call set-up, a message waiting means MWM for message waiting control, an operator service means OSM for operator services and a group services means GSM for group services (ACD: Automatic Call Distribution, Group Hunting, etc.). The supplementary services means SSM can also be extended later to new as yet not existing services related to multi media terminals. Since the BSM and SSM are separate in two different devices, it is possible to add new services in the supplementary services device SSM without affecting the control functions of the basic services device BSM. As shown on the right hand side in FIG. 10, the basic services device BSM and the supplementary services device SSM perform the listed functions during communications CC between multimedia terminals MT1, MT2, between telephony terminals TT1, TT2 and between multimedia terminals and telephony terminals MT2, TT1.

Operation and Maintenance Layer

This layer implements the necessary functions for setting and reading the parameters particular to the multimedia terminals and not covered by the PABX's generic O & M sub-system. These parameters are those which are of use only when dealing with MTs. For instance, a Transport Address is of no use for an analogue phone. A digital phone does not have any password associated to it in order to access the PABX. These and other parameters specific for MTs are set by means of the O&M layer. As a possible list of parameters set by means of the O&M layer for MTs, there are for example:

Transport Address
User Identification.
Password
URL address
e-mail address

However, any of these parameters might be or might not be initiated for a given MT. For example, a MT which does not require authentication would not have a Password associated. A MT which does not have a fixed TA (like e.g. a mobile PC) would not have a Transport Address associated, or perhaps it had it, but then also a Dynamic Transport Address not initiated via O&M should exist in the system. Therefore, the OML Layer sets one or more of the aforementioned parameters depending on the type of MT.

Figure 11:
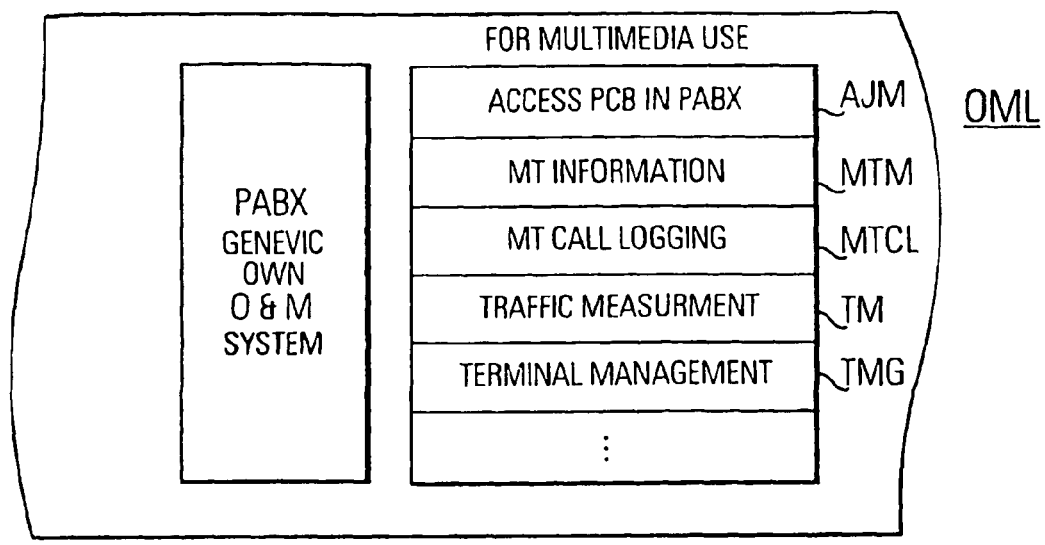
FIG. 11 shows a functional block of the operations O & M operation and maintenance layer means OML.

As shown in FIG. 11, the PABX has its own generic O & M system and the OML device implements further O & M operations for adding, removing, configuring and printing out information about access PCBs in the PABX; adding, removing, configuring and printing out information about multimedia terminals which are extensions in the PABX. Furthermore, in the OML device the functions that carry out the multimedia terminal's specific part of the generic call and terminal management processes in the PABX are located. Such processes are for example the call information logging functions which collect data about calls such as call duration, source and destination addresses, call cost, etc. Furthermore, it carries out traffic measurement functions which collect data about call traffic such as the total number of calls, number of failed calls, mean and peak traffic intensity, etc. Furthermore, the OML device incorporates terminal management functions such as the setting of categories, assigning of E.164-compliant directory numbers and printing out of terminal related information (terminal type, directory type, category) etc.

As explained above, the multimedia controller MMC in accordance with the invention comprises a plurality of devices ALM, PALM, MHL, AL, OML which communicate among each other in order to make the multimedia terminal MT a normal extension of the PABX extension space and for extracting from the data communication arriving in the data network protocol format the respective signaling messages which are needed for controlling the switching resources SW and for routing the multimedia data streams through the so controlled switching subsystem SW. Hereinafter, the special interaction of these devices is explained with reference to flow charts in FIGS. 12–17 and a skilled person realizes on the above descriptions the respective usage of the devices in these procedures even if no explicit reference is made to these blocks. Therefore, it should be understood that an interaction of all devices is respectively performed whenever one or more of the procedures described below are carried out.

Interaction of the ISO OSI layers

In the ISO OSI reference model shown in FIG. 4, a generic architecture for communication between peer entities is defined. By 'peer entities' it is understood that the entities are twin, as opposed to e.g. the client-server model where both parties have differentiated roles and features.

This architecture is defined in such a way that for a given entity in a given layer in a given party, it seems as if it was communicating with a peer entity in the same layer of the remote party. However, what actually goes on is that said entity is communicating with another entity in the underlying layer in its same party. This holds true for any layer except for the physical layer which is the only one which actually has a peer-to-peer communication with the physical layer of the remote party.

The communication between a given entity in a given layer and its peer remote entity is done by means of the aforementioned "primitives". Each layer defines certain primitives used for carrying out this communication. A primitive of the Data link layer might be e.g. "send a data frame to peer" if point-to-point communication, or "send a data frame to peer at address xxx . . ." in case of a point-to-multipoint communication.

At the application layer AL, primitives are function calls, usually provided by an API (Application Programmer Interface) of the underlying layer. At the application layer of a telephony application, for instance, there might be a primitive such as "startCall(E.164 number)".

A given layer's primitives are accessible at a so-called SAP (Service Access Point) as shown in FIGS. 6, 7, 8, 9a, 9b. The SAPs are normally preceded by a prefix that indicates which layer the SAP belongs to. Examples of this are Transport layer SAPs (TSAPs) or Network layer SAPs (NSAPs). Therefore an entity in the Transport layer of a given peer communicates with the Network layer of this same peer via one or more NSAPs (it should be noted that said entity is not aware of whether it is talking to its remote peer or to its underlying layer).

Normally, one SAP is used for every instance of a communication process, in such a way that if a certain entity at let's say the Application layer of one peer is holding three calls to its remote peer, then it will "talk" with three different TSAPs of its underlying Transport layer.

All this is to explain the communication when "A is connected to B". Normally, this means that A and B are communicating peers at the same layer in different machines, which establish a dialog by means of the corresponding primitives.

As an example of this, if A is a Multimedia Terminal and B is a Multimedia Network Controller, the connection "MT is connected to MNC" means that the Application layer of the MT is talking to the Application layer of the MNC, even though every primitive invoked by said MT's Application layer in order to send something to its peer at the MNC is actually sending a message to the MT's Transport layer, and in turn to the MT's Network layer, and so on down to the MT's physical layer which is the one that actually send the electrical signal to the MNC's Physical layer.

In view of the above explanations it should be noted that all operations carried out in the flowcharts of FIGS. 12–17 and their associated descriptions in the text relate to and are performed in the Application layer.

The data packets and signaling packets are delivered to the corresponding layer (Media Handling or Protocol handling, respectively) as follows. Namely, the data packets and signaling packets use different TSAPs. The Media Handling layer accesses one TSAP, and the Protocol Handling layer accesses a different TSAP. The MT sending a data packet will send it to the receiving AL's TSAP used for receiving media (in case the Media Handling block was involved in the call), and will send a signaling packet to the receiving AL's TSAP used for receiving signaling. The receiving AL's TSAP for signaling has been obtained by the sending MT by means of the "register ack" message as will be explained with reference to FIG. 13b (step ST13b9) below. The receiving AL's TSAP for media might be included by the receiving AL in any call signaling message sent by the AL to the MT (e.g. the "call progress" message).

Second Embodiment (Integration of MTs in the PABX)

It should be noted that all operations in the diagrams FIGS. 12–17 are done by the application layer. That is whenever "Application Primitives" are referenced in the drawings or the text, this term refers to primitives issued by/to the Application layer only, and an "Application Primitive" is never going to or coming from anywhere but the Application layer.

Claim 3 of the attached claims relates to the second embodiment described here and to the third embodiment described hereinafter. Also claim 4 of the attached claims relates to the second embodiment described here and to the third embodiment described hereinafter. FIG. 12 illustrates a method according to the second embodiment of the invention for initiating a multimedia terminal as part of the PABX's extension space. This initiation process is necessary in order to treat the multimedia terminal MT as a normal telephony terminal TT in the PABX's extension space.

The multimedia terminal MT when used in the data network is not identified by a directory number (such as an E.164 number) but is identified by data structures normally used in the data network. Therefore, the multimedia controller MMC of the PABX system must hold somewhere the multimedia terminal's data structures comprising the network and transport addresses of the multimedia terminal, security information (user name, password, category profiles) of the multimedia terminal MT, the identification of the multimedia terminal in the network (e.g. an e-mail address, an URL-address etc.), multimedia functionalities (such as audio, video, data using different standards etc.) and other related data. For example, the data structure may also comprise a dynamic network address of the multimedia terminal which might change over the time and which is thus dynamically updated whenever it changes.

By means of the procedure in FIG. 12 an extension is added in the O & M device OML for allowing an administrator or a device to relate a directory number in the PABX's number space to these new data structures by means of whatever O & M operations exist.

The administrator is an entity external to the system (may be human or automatic device) which has rights to interact with the systems's O&M layer. Note that square blocks in FIG. 12 represent O&M operations, which are actually carried out by the O&M layer but ordered by the administrator. Therefore the decisions in said figure are taken by the administrator, not by the O&M layer. For example, if the administrator tries to initiate a new Directory number in the system and, when carrying it out, the O&M layer sees that for some reason this is not possible, the O&M layer just reports this condition to the administrator. Then it is an administrator's task to stop the whole process.

FIG. 12 shows how the relationship between the directory number and the data structures is set up such that all existing O & M processes which the PABX makes available for other extensions TT are potentially available also for multimedia terminals MT.

In step ST121 the OML device creates a new directory number for the multimedia terminal MT to be added. If in step ST122 no such directory number is created, the process is stopped. In step ST123 a data structure relating to the particular multimedia terminal MT to be added is set up in a database DB which can for example be part of the OML device. In step ST123 the data structure is set up with the transport address, identification, authentication and the capabilities of the new multimedia terminal MT as shown in FIG. 12. Such an initiation of the data structure can be performed by executing an inquiry/response procedure with the newly connected multimedia terminal MT. If in step ST124 it is determined that the data structure is confirmed to be correct, then the administrator (manual or automatic) creates a link (a relationship) between the newly created directory number and the MT data structure in step ST125 (which is most significant and innovative aspect of this procedure). If in step ST124 the data structure is determined to be incorrect then the process is stopped. However, if the data structure has been correctly set up and the link is created in step ST125, then the multimedia controller MMC can handle the newly added multimedia terminal MT with its specification defined in the data structure simply as a normal PABX extension just like any other telephony terminal TT. Such a relationship is stored in the database DB for each and every newly added multimedia terminal MT.

As mentioned before, some basic items must be set in the data structure, for example the transport address, the identification, the authentication and the capabilities, when the multimedia terminal MT is added. However, there may also be time-varying information such as a dynamic network address of the multimedia terminal MT which can change over time. Then, whenever this dynamic network address changes a respective updating of this entry in the data structure of the multimedia terminal MT is performed.

Therefore, one can say that the procedure in FIG. 12, i.e. setting of the data structures and the cross-link to a newly created directory number for each and every multimedia terminal MT, makes the multimedia terminal MT "visible" in the PABX network just like any other telephony terminal TT which is handled and processed by means of its directory number. That is, the administrator creates the link between directory number and MT's Data Structure by ordering a "link" operation to the OML providing the directory number and a pointer to the MT's Data Structure.

Third Embodiment (MT Discovery and Registration)

For multimedia terminals MTs which have dynamic characteristics, i.e. characteristics that may vary along time and for those which want to take advantage of freeseating, i.e. to take advantage of the possibility of connecting to the PABX network from different access points keeping the same user profile (i.e. using the PABX freeseating feature also for MT terminals), a discovery and registration process is necessary in order for the multimedia terminal MT to access PABX facilities. Thus, according to the invention the MTs enjoy e.g. the PABX's freeseating functions. It should be noted that there are different types of freeseating. The freeseating which is conventionally a PABX feature, means that a PABX's user is able to log-in to the PABX from any terminal no matter where or what kind of terminal it is. By making the multimedia terminals MTs "visible" (in accordance with the invention) for the PABX as any other kind of terminal, this freeseating function, already existing in the PABX, is enabled for MTs also.

The registration process must be started by the multimedia terminal MT and must be acknowledged by the PABX multimedia controller MMC. Such a registration process is typical if the multimedia terminal MT performs a registration in the data network. Also in a data network the multimedia terminal MT must know the transport address e.g. of a gatekeeper through which the respective protocol handling layer receives registration messages. Likewise, when the multimedia terminal MT whose data structure has been set up in the database and has been linked to a directory number wants to access the PABX network, it must receive information about the transport address in which the protocol handling layer means PHLM shown in FIG. 8 receives signaling messages and registration messages. This transport address of the protocol handling layer device PHLM is then used by the multimedia terminal MT to send a registration message to the PABX controller. One possibility is that manually the transport address set in the protocol handling layer device PHLM is programmed (stored) in the multimedia terminal MT.

The third embodiment of the invention for discovery and registration relates to claim 2 and claim 10 of the attached claims and the subject matter of claim 3, claim 4 and claim 7 relates to both the second and third embodiment. FIG. 13a shows a flow chart of how an automatic transport address discovery process can be carried out. The purpose of FIG. 13a is to send a discovery message to a fixed known transport address through which one or more PABX's protocol handling layer devices PHLM are receiving discovery messages. Every PABX controller of a plurality of PABX networks which is ready to accept the multimedia terminal in its extension domain will send back to the multimedia terminal MT the transport address through which the respective protocol handling layer device PHLM is receiving registration admission and status (RAS) messages. Knowing this transport address the multimedia terminal MT can then perform a registration process as shown in FIG. 13*b*. the purpose of the procedure in FIG. 13*b* is to allow the multimedia terminal MT to send the registration message to the obtained transport address of the protocol handling layer. The application layer connected to the protocol handling layer in this address will process this message and will send back an acknowledgement to the multimedia terminal notifying an acceptance or rejection of the multimedia terminal MT in the extension space of the PABX. Even if a manual setting of the transport address is performed in the multimedia terminal, it is still possible to send a discovery message to the thus configured transport address. This could be useful for making both ways of finding out a transport address for registration in a more homogenous way. The most important aspect in FIG. 13*a* is the innovative aspect of the procedure to process the discovery request shown on the right hand side in FIG. 13*a*.

It should be noted that a prerequisite for carrying out the procedures of discovery and registration in FIGS. 13*a*, 13*b*, is that the data structures of the multimedia terminal MT have already been set in accordance with FIG. 12.

In step ST13*a*1, ST13*a*1' the multimedia terminal MT sends a discovery message including its identity to (a fixed transport address of the protocol handling layer of) the PABX multimedia controller MMC (via the protocol handling layer PHLM to the application layer AL of the controller MMC) just as if it was doing so for discovering a transport address in a discovery process carried out in a data network. Therefore, in FIG. 13*a* the new aspects of the third embodiment of the invention are on the right-hand side, in the algorithms of the PABX controller and not on the left on the multimedia protocol signaling side which are well established procedures in a multimedia data network.

In step ST13*a*2 the multimedia controller MMC performs an identity check against the identity information stored in the data structures of the database DB. This is done in order to find the directory number that corresponds to the identity information provided in the discovery message in step ST13*a*1.

Preferably, a discovery message in step ST13*a*1, ST13*a*1' can contain several identifications provided by the multimedia terminal MT (e.g. an e-mail address, a URL etc.) and therefore all of the provided identities are compared with the data structure(s) stored in the database DB. If all identities provided in the discovery message match the entries in the set-up data structure (in the O & M layer means OML) then in step ST13*a*3 it is determined that the relationship between the created directory number and the multimedia terminal identification is valid.

If, however, in step ST13*a*3 one or more of the identity matchings fail, the discovery attempt will be rejected in step ST13*a*7.

It should be noted that the identity information sent by the multimedia terminal MT could be anything allowed within the discovery message in use. Therefore, as explained above, it is preferable to have a database DB in the multimedia controller MMC which relates directory numbers to any kind of identity (e-mail address, URLs etc.). As explained above, the same database DB holding the data structure can also be used for holding the user identities and the password lists associated to the newly created directory number.

In step ST13*a*4 it is determined by the multimedia controller MMC whether or not to admit the multimedia terminal MT in its extension space and if so determined in step ST13*a*5 a confirmation is determined in step ST13*a*6. Then, the protocol handling layer means PHLM sends back in step ST13*a*8 a message with the desired transport address through which the protocol handling layer is receiving registration admission and status (RAS) messages. Knowing this transport address the multimedia terminal MT can now perform a registration process as shown in FIG. 13*b*. The most important aspect in FIG. 13*b* is the innovative aspect of the procedure to process the registration request shown on the right hand side in FIG. 13*b*.

If in step ST13*a*3 or ST13*a*5 the identity check and/or the admission is negative a discover rejection message is determined in step ST13*a*7 and is sent to MT in steps ST13*a*8', ST13*a*8.

It should be noted that the multimedia controller MMC can also take a decision about the Transport Address which it sends back to the multimedia terminal MT which started the discovery process. If the multimedia controller MMC has knowledge of different PSAPs and their corresponding Transport Addresses, it could decide to send any of these Transport Addresses to the multimedia terminal MT in the discovery acknowledge message. In this way, the multimedia controller MMC is able to direct the multimedia terminal MT to register using another PSAP within the multimedia controller MMC scope, or even a PSAP within the scope of a different multimedia controller MMC in case the multimedia controller MMC receiving the discovery message had knowledge of Transport Addresses associated to said PSAP.

The criteria used by the multimedia controller MMC to decide which Transport Address is to be send back to the multimedia terminal MT sending the discovery message comprise one or more of the following criteria:
- a Transport Address associated to a PSAP under low load conditions;
- a Transport Address associated to a PSAP which is working properly;
- a Transport Address associated to an external (under the scope of another multimedia controller MMC) PSAP which is less loaded than this MMC's PSAPs;
- a Transport Address associated to an external (under the scope of another multimedia controller MMC) PSAP which corresponding MMC is supporting a lower signaling load than the deciding multimedia controller MMC.

In step ST13*b*1, ST13*b*1' the multimedia terminal MT sends a registration message to the transport address of the protocol handling layer means PHLM which has been either manually set or obtained via the discovery procedure of FIG. 13*a*.

In step ST13*b*1' the message is passed on to the application layer means AL. In step ST13*b*2 the multimedia controller MMC performs an identity check of the identity, user name and password and optionally of additional dynamic data. This check procedure is carried out in accordance with FIG. 13*c*. The identity check procedure in FIG. 13*c* is one of the important aspects of the present invention.

If the provided information is determined to be valid in step ST13*b*3, in step ST13*b*4 the data structure(s) of the multimedia terminal MT is located in the database DB. This is done by using the information which has been checked in step ST13*b*2 and which was provided in the registration message ST13*b*1. If a match to one of the data structures is found in step ST13*b*5 ("YES") if a security check in step ST13*b*2' where security information contained in the registration message is checked against security information in the data structure (data base) is completed positively in step ST13*b*2", then a possible updating of the entries in the data structure of the multimedia terminal MT is performed in step ST13*b*6. If the result is confirmed in step ST13*b*8 then a registration acknowledgment message comprising a transport address through which the protocol handling layer is receiving call signalling messages is sent back to the multimedia terminal MT in step ST13*b*9, ST13*b*9'. If the result is no in step ST13*b*3 or ST13*b*5 then a rejection message is sent to the multimedia terminal in step ST13*b*7 and sent in step ST13*b*9", ST13*b*9', ST13*b*9 to the multimedia terminal via the application layer ALM and the protocol handling layer PHLM.

FIG. 13*c* shows the step ST13*b*2 of FIG. 13*b* with more details. That is, FIG. 13*c* shows the algorithm which allows the multimedia controller MMC to verify a given MT's identity.

As shown in FIG. 13*c* the database DB containing the data structures of the multimedia terminals MT also has three different registers IM-INDX, URL-INDX, E.164-INDX holding the respective e-mail addresses, URL identities and E.164 identities which are allowed to be processed in the PABX network. In steps ST13*c*1, ST13*c*4, ST13*c*7 it is respectively checked whether the registration message sent from the multimedia terminal MT contains an e-mail address, a URL or a E.164 directory number. In step ST13*c*2, ST13*c*3; ST13*c*5, ST13*c*6; ST13*c*8, ST13*c*9 each of the identities contained in the registration message are checked against the entries in the EM-INDX, URL-INDX and E.164-INDX registers. If the entries are respectively found (yes in step ST13*c*3, ST13*c*6, ST13*c*9) then step ST13*b*3 in FIG. 13*b* continues with step ST13*b* 4, i.e. it tries to locate the data structure and the directory number corresponding to the multimedia terminal MT whose identities have been positively checked in FIG. 13*c*.

Although in FIG. 6 only one physical signal access port PSAP is shown, preferably the PABX network may have several PSAP access points. If different multimedia terminals MT carry out the procedure in FIG. 13*a* and/or FIG. 13*b* the multimedia controller MMC can provide to each of the registering multimedia terminal MT a different transport address during the registration process. The multimedia controller MMC can thus distribute the signaling load to different physical signal access points PSAPs. The optimal assignment of transport addresses to different multimedia terminals MT can be carried out in different ways depending on the procedure which is used in the multimedia terminal for obtaining the transport address for registration. In a fist case "manual" the PABX's application layer means AL receives the registration request through the PSAP, does a series of checks to decide which PSAP is more suitable for being used by the multimedia terminal and once this is decided the multimedia controller MMC delivers the transport address in a registration acknowledge message in step ST13*b*9. Thus, the delivered transport address belongs to a transport address range of a particular PSAP. In an automatic procedure (or a manual procedure with a previous discovery) the PSAP checking is done during the discovery process.

The multimedia controller MMC can determine which transport address to supply to the registering (or discovering) multimedia terminal MT based on the following considerations: the less loaded PSAP, the PSAP with the lowest mean load, the PSAP whose physical elements are working or the PSAP to which the smaller number of MTs have been assigned.

Therefore, during the discovery and registration processes the multimedia controller MMC can advantageously distribute signaling a load from various multimedia terminals MT to different PSAPs by providing different transport addresses based on the signaling load distribution.

The usage of the transport addresses is therefore as follows. As explained above, the transport addresses TA The TAs are the addresses used at the Transport layer. However, a given Transport layer message which is to be sent to a given Transport entity addressed by its TA, must sooner or later go through two PSAPs (one on the message sender and another one on the message receiver). The source PSAP (the one used on the message sender) is not relevant for finding the message receiver, but the destination PSAP (the one used on the message receiver) must, in one or other way, be obtained at some layer in the message sender before putting the message onto the physical medium.

In order to be able to send a Transport layer message to a Transport entity in the network, a PSAP which may access said entity must be located. Consequently some association between PSAPs and TAs must exist somewhere in the network and must be accessible for Transport entities willing to send a given message to a given TA. Therefore, on the basis of a given TA a corresponding PSAP can be identified. An Application layer then then knows what TAs correspond to the PSAPs it is controlling (which are those in the same machine as said Application layer runs) and delivers to another Application layer of the receiver a TA that corresponds to one of these PSAPs selected according to certain conditions (e.g. in accordance with the distribution of the signaling load.

Fourth Embodiment (Basic Call Set-up Procedures)

As explained above, the multimedia controller MMC according to the first embodiment having the devices explained in FIGS. 5–11 is capable to directly treat the multimedia terminal MT as an extension of the PABX network in accordance with the second embodiment and in accordance with the discovery and registration procedures in accordance with the third embodiment. Thus, the multimedia terminal MT can be made "visible" in the PABX network and thus signaling messages sent by a recognized and registered multimedia terminal MT can be sent to the multimedia controller MMC and can be used therein for controlling the switching subsystem SW of the PABX network based on the contents of the so received recognized and interpreted signaling messages.

Hereinafter, with reference to the flow charts in FIGS. 14, 15*a*, 15*b*, 15*c*, 15*d* basic call set-up procedures where such a control of switching resources is performed on the basis of signaling messages will be explained in accordance with the fourth embodiment with the invention. The fourth embodiment of the invention relates to claim 1and claim 11, 12, 13 of the attached claims. All steps in FIG. 14 relate to the new innovative concept of the invention.

For these call set-up procedures the following devices (layers) of the multimedia controller MMC shown in FIG. 4 are generally necessary. For a call set-up the multimedia terminal MT exchanges call signaling messages with the multimedia controller MMC. These call signaling messages are part of the multimedia protocol messages MPMDS provided to the protocol control device PCM of the protocol handling layer device PHLM shown in FIG. 8 from the transport service access points TSAP of the network and transport sub-layer device NTSUB shown in FIG. 7. The call control device CCM in FIG. 8 which is also part of the protocol handling layer device PHLM will provide a mapping between these signaling messages MPMDS and the call-related application primitives CRAP provided to and understood by the application layer device AL.

This "mapping" comprises the task carried out by the Protocol Control block, which on reception of a given Multimedia Protocol message, generates the corresponding Application Primitive which is then sent to the Application layer. In the same way, this mapping covers the case where the Application layer generates an Application primitive which it sends to the PHL. Said primitive is then mapped to a corresponding Multimedia Protocol message. This scheme allows the Application layer to be independent of the Multimedia Protocol used, since if said protocol changes, only the PHL is affected (as long as the Application Primitives remain unchanged).

Considering the configuration in FIG. 2 or in FIG. 3, whenever a call is set-up between two or more multimedia terminals MT, two or more telephony terminals TT or between one or more telephony terminals TT and one or more multimedia terminals MT there are cases where the internal PABX switching sub-system resources SW are necessary for transferring the media data streams and cases where it is not necessary. The rules that govern the seizure of internal PABX switching resources SW for transferring the media streams between the terminals involved in a call are the following.

Firstly, in the conventional case, when one or more terminals involved in the call are not multimedia terminals MT, then the switching resources SW of the circuit switched network PABX for that call must be seized. This is the case where for example two telephony terminals TT conventionally use the PABX system.

Secondly, if all terminals involved in the call are multimedia terminals MT and it is not possible to directly set-up an end-to-end network path between them, then the switching resources SW must also be seized for that type of call.

Thirdly, if the terminals involved in the call are multimedia terminals MT and there is the possibility to set-up an end-to-end IP network path between them, but the multimedia terminals MT do not support a common coding scheme for the media streams to be exchanged, then also switching resources SW of PABX system must be seized for setting-up the call. That is, in such a case the conventional call set-up routing through the switching resources SW of the PABX system is necessary. With common coding scheme is meant that the coding of digital data for each of the media streams sent from the two different multimedia terminals MT is different. With a "common coding scheme" is meant a coding standard (i.e. G.711, G.723, H.261 etc.) which can be encoded/decoded by both parties. If one MT party encodes voice according to G.711 and the other MT party can only decode voice according to G.723, then voice communication between these parties would be impossible without a common coding scheme.

Fourthly, if all the terminals involved in the call are multimedia terminals MT, it is possible to set-up an end-to-end network path between them, all of them support at least one common coding standard for the media schemes to be exchanges but the service level delivered by the data network is not sufficient enough for the purpose of communication, then optionally switching resources SW may be seized for that call.

In the aforementioned first to fourth cases the call is either routed only through the switching means of the PABX system (first to third case) or the switching resources SW are used as supplement to the routing possibilities already provided by the data network. If the switching resources SW of the PABX system are to be used for setting up the call for routing the multimedia data streams between the terminals, of course no modification in the actual PABX switching resources SW should be performed since otherwise the switching resources SW would also have to be adapted to the specific type of data network.

In order to not impose modifications in the already existing PABX's software, the multimedia controller MMC of the present invention decides, on the basis of the signaling information received from the multimedia terminals, whether switching resources SW must exclusively or additionally be used for the set-up of a call. In particular, it is the application layer device AL connected to the multimedia terminals MT which can decide whether such resources are necessary. If the multimedia controller MMC performs the decisions as to whether or not these switching resources are necessary, the PABX's core software remain unaffected and the decision process is generic for all kinds of extensions (multimedia terminals MT and telephony terminals TT).

The basic requirement that the application layer device AL of the multimedia controller MMC performs such decision is that this application layer device AL which is connected to one multimedia terminal MT knows the type of extension to which its peer entity is connected. The term "connected" in this case means that the Application layer in the MT exchanges messages with the Application layer in the MMC via their respective Access layers. So in this case "connection" means peer-to-peer connection, although the messages exchanged actually go through several layers down and up in order to travel from peer to peer. The term "extension" here refers to a TT. The term "peer entity" here means that the AL handling one call between one MT and another terminal must know that said terminal is a TT. In other words, the application layer AL must know the type of terminals (MT or TT) that are involved in the call, because if the call is between a MT and a TT, then use of PABX's switching resources SW is necessary (since MTs and TTs use different transport networks, and the only interconnection between said networks is the PABX's switch).

Figure 14:
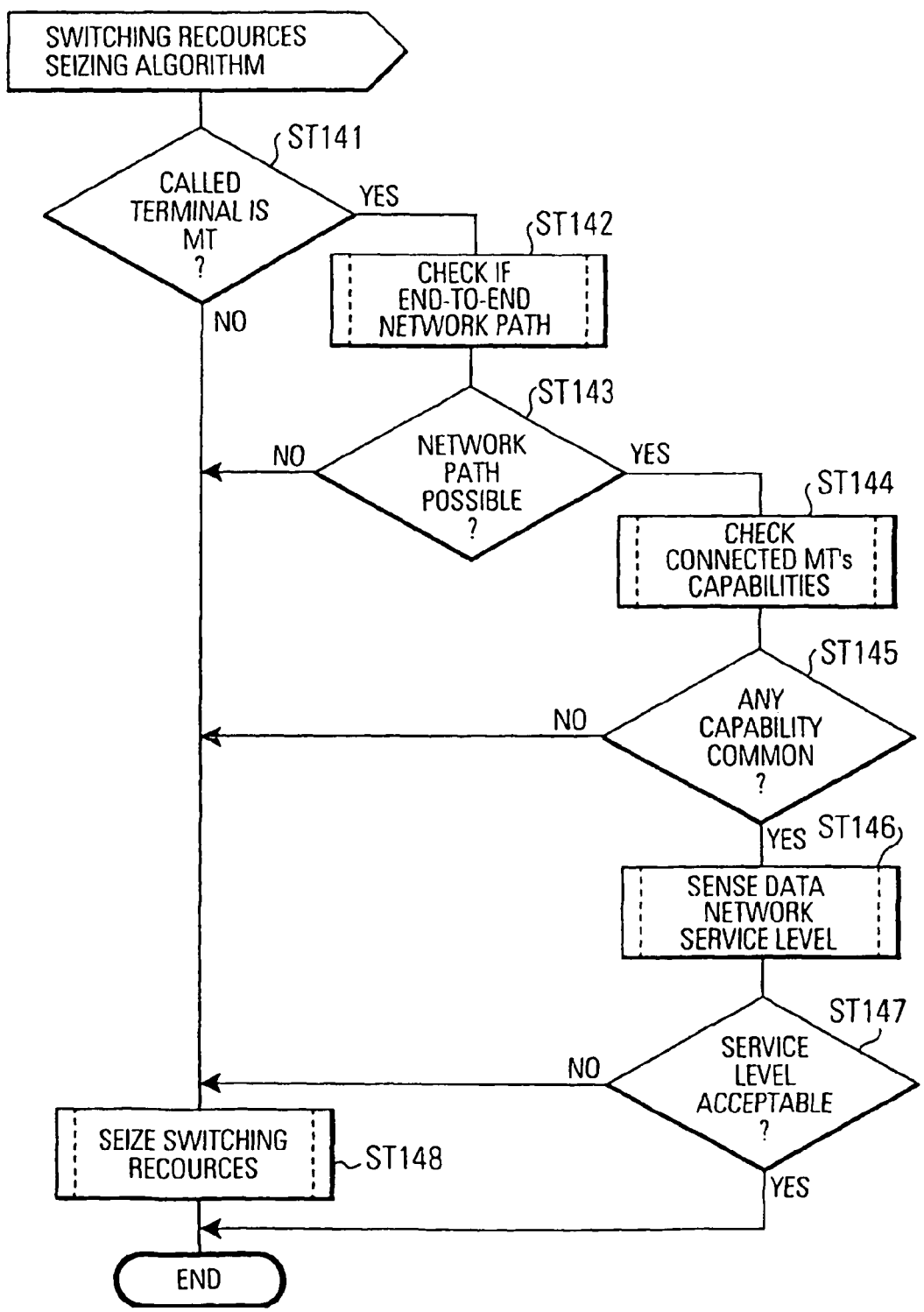
FIG. 14 illustrates a diagram of a switching resources seizing algorithm where the PABX decides whether internal switching resources of the PABX should be used for a type of a communication between the subscriber stations.

Once, the application layer means AL knows the type of extension to which is peer entity is connected, the process shown in FIG. 14 is carried out. FIG. 14 basically is a flow chart which shows how the multimedia controller MMC decides whether internal switching resources SW should be used for the communication. The switching resources seizure algorithm in FIG. 14 is used in the application layer means ALA just after step ST15*a* 5 in FIG. 15*a* and after step ST15*d*1 in the application layer means ALA in FIG. 15*d*.

Step ST141 is entered once the multimedia controller MMC recognized a call set-up message from any connected (or registered) extension (multimedia terminal MT or telephony terminal TT). Having performed the discovery and registration procedures of FIGS. 12, 13, the multimedia controller MMC can recognize whether the extension which sends a call set-up message is a multimedia terminal MT or not. This is so because the multimedia terminal MT, when sending the call set-up message, will send this call set-up message to the transport address with which it has been provided during the registration and it will also include an identification and authentication and information about its capabilities. Thus, by matching these information to the data structure set-up for the (registered) multimedia terminals MT in the data base DB, the application layer means AL can recognize whether the call set-up message comes from a multimedia terminals MT or a telephony terminal TT. If the answer in step ST141 is "no", then the call is to be set up to a telephony terminal TT which automatically requires the use of switching resources SW of the PABX in step ST148. That is, the flow diagram in FIG. 14 is executed by the application layer means ALM that receives a call setup message from an MT. This call setup message contains the called party's E.164 number (or another identification in case of called party is a MT). From this called party identification the AL can identify whether the called terminal is MT or TT.

However, if a multimedia terminal extension is recognized in step ST141, then step ST141 checks, whether an end-to-end network path can be set-up. With end-to-end network path is meant a direct path or route within the data network and not within the PABX. To check whether such a network path is possible in step ST143, an intermediate connectivity test can be performed. Preferably, the multimedia controller MMC can send some test packet to the called multimedia terminal MT. The called multimedia terminal MT is to send back the test packet unmodified which indicates that the network path is possible. If the data network is an IP network, a so-called "ping packet" can be used as a test packet to test whether an end-to-end network path is possible. If the end-to-end network path is not possible in step ST143, then it is of course necessary to seize switching resources SW in step ST148. It should be noted that the multimedia controller MMC in this case is only responsible for initiation of the sending of this test packet to the connected multimedia terminal MT on the basis of the signaling messages from a calling multimedia terminal. The PABX switching resources are actually not used during the sending of this test packet.

Even if the network path through the data network has been confirmed in step ST143, in step ST144 the capabilities of the connected multimedia terminal MT must be checked. With capabilities is meant here for example whether the multimedia terminal supports audio, video, and/or other digital coding schemes. In order to check these coding schemes, the application layer device AL of the multimedia controller MMC sends to the remote application layer device AL of the called multimedia terminal a coding standard request to inquire about the coding standards which are supported in the multimedia terminal MT. When the called multimedia terminal MT responds with a message containing the supported coding standards, these received coding standards are compared with the coding standards supported by the calling multimedia terminal MT in the application layer AL in order to find out, whether there are any coding standards in common between the calling and called multimedia terminals MT. As may be noted, the application layer AL can directly send such a request message as a signaling message to the called multimedia terminal MT by using the respective messages described with reference to FIGS. 5, 6, 7, 8, 9*a*, 9*b*. If in step ST145 it is determined that there are no common coding standards, then switching resources SW of the PABX must be used, i.e. the multimedia streams MMS must be converted by the media gateway device MGM to be routed as converted data streams PIMFM having the PABX's internal media format through the switching subsystem SW of the PABX. The aforementioned procedure is for detecting the coding schemes supported by the called terminal and is one possible way to obtain this information. However, the preferred procedure is that the AL talking to the calling terminal (the one that sends the call setup message) uses the called terminal's identification provided in said message to access the database and find the called terminal's data structures. These structures hold, between other data, the terminal's capabilities, i.e. the coding schemes of the called terminal. The first mentioned method might be used in case said data structures do not hold the terminal's capabilities at all.

Regarding the implementation in FIGS. 5–9, in these figures PIMFM refer to data; and AP, CRAP refer to signaling (they are Application Primitives). MPMDS refer to both data and signaling. Note that the Access layer is a common resource which does not distinguish between data and signaling. The Access layer just receives something from the physical network and sends it up to the upper layers in form of a packet.

As explained above, the data packets and signaling packets are delivered to the corresponding layer (Media Handling or Protocol handling, respectively) as follows. Namely, the data packets and signaling packets use different TSAPs. The Media Handling layer accesses one TSAP, and the Protocol Handling layer accesses a different TSAP. The MT sending a data packet will send it to the receiving AL's TSAP used for receiving media (in case the Media Handling block was involved in the call), and will send a signaling packet to the receiving AL's TSAP used for receiving signaling. The receiving AL's TSAP for signaling has been obtained by the sending MT by means of the "register ack" message as explained with reference to FIG. 13*b* (step ST13*b*9). The receiving AL's TSAP for media might be included by the receiving AL in any call signaling message sent by the AL to the MT (e.g. the "call progress" message).

If in step ST145 it is determined, that in addition to the possibility of setting-up a direct end-to-end network path through the data network and also the coding standards of the calling and called multimedia terminals MT are the same, it may still be the case that the data network service level is insufficient for performing a good data exchange through the data network. Therefore, in step ST146 the data network service level is sensed. The following procedure can be used in order to test the data network service level. For this purpose, the application layer AL again sends a test packet with a time-stamp to the called multimedia terminal MT. The called multimedia terminal MT should time-stamp the packet also when it is sending it back. When receiving back the sent-out test packet, the application layer device AL can determine the round-trip delay time existing in the path between the calling and the called multimedia terminal MT. If the data network is an IP-network, a so-called "ping packet" can be used.

Another possibility is that the multimedia controller MC instructs some device in the data network to compute statistics about the data network status. The application layer device AL of the multimedia controller MMC can then sent an inquiry message or wait for a response message from the statistics computing device to obtain information about delay, packet loss etc. Thus, the multimedia controller MMC shown in FIG. 4 can actively communicate with the multimedia terminal MT or a further unit in the data network by exchanging signaling messages in order to determine not only the possibility of a direct network path and the matching of the coding schemes but also the data network service level. If in step ST147 it is determined that the service level is acceptable, then only in this case the multimedia controller MMC has decided on the basis of exchanging the signaling messages with the called and calling multimedia terminal MTq that no switching resources SW of the PABX are necessary.

If however the answer in step ST141, ST143, ST145 and ST147 is negative ("no") then invariably there is the necessity of at least additionally using switching resources SW of the PABX switching sub-system in step ST148. In order to seize switching resources in the PABX's internal switch (i.e. in the switching sub-system SW of the PABX), two different procedures can be used in step ST148. Either the local multimedia controller application layer AL requests the resources from the PABX or the local multimedia controller application layer AL leads its connected peer entity to seize the resources from the PABX.

With "connected peer entity" is meant the AL talking to the other MT. For example, in FIG. 15a there are two ALs involved in the call. This is the case when the PABX has a distributed architecture (as is assumed in FIG. 15a). In this architecture the calling and called MT might be controlled by different modules of the PABX. Few PABXs in the market have however this distributed architecture. FIG. 15c shows the case where AL A and AL B are merged into one ALA, skipping all signals between them ALA and ALB. However, the function is the same as in FIG. 15a. FIG. 15c is the so-called non-distributed architecture or centralized architecture and FIG. 15d shows the corresponding flow charts (all the steps in FIG. 15d relate to the innovative aspects of the present invention). In FIG. 15c the most important aspects of the invention are the performing of the source and destination transport address selection algorithms.

If no PABX switch congestion can take place, then both procedures are suitable in ST148. But if the PABX switch congestion may take place, the second alternative is preferable. The reason is that when a switch congestion occurs in the PABX, in the first alternative the call set-up is lost since the calling party cannot proceed with the call set-up because a switch path is needed.

However, if in the second alternative the remote peer entity finds a switch congestion, it can report this congestion back to the calling application layer AL (in the calling multimedia terminal MT) which can then go on with the call by e.g. requesting some supplementary service on that call (call-back for instance).

During the call set-up phase one multimedia terminal MT and the PABX multimedia controller MMC must exchange transport addresses to which they are supposed to send their media streams. The question as to which transport addresses are used is also influenced by the result of the switching resources seizure algorithm described above.

As explained above, the application layer of the multimedia controller connected to the called multimedia terminal MT must send a transport address about the PABX's physical service access point PSAP (FIG. 6) selected for receiving not only the signaling but also the media data streams of the call. If the application layer forwards a transport address of a PSAP, it is clear that switching resources have been seized for the call. Alternatively, the application layer connected to the calling MT forwards the transport address of the remote MT which is a case in which all remote terminals involved in the call are multimedia terminals MT and it is thus not necessary to seize switching resources SW. The algorithm in FIG. 14 applies to calls MT->MT and MT->TT. In calls TT->MT, it is the PABX core SW which will have seized switching resources for the call, as it does for a normal TT->TT call. Therefore it is not necessary that the AL talking to the called MT seizes switching resources for the call.

Figure 15A:
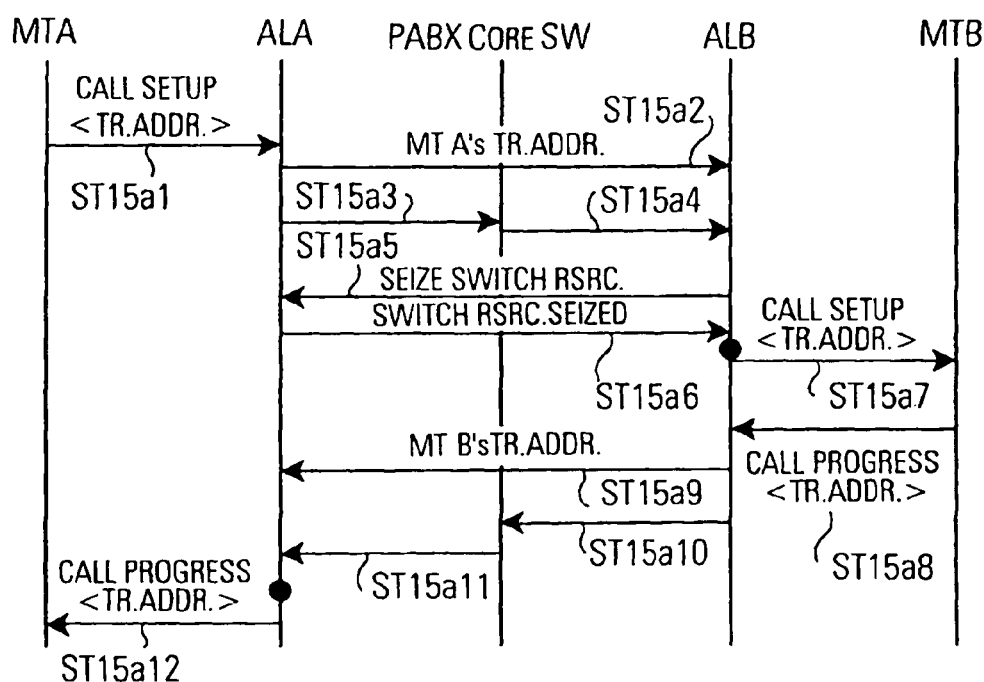
FIG. 15a illustrates the sending of messages internally in the PABX for setting up a new call between two multimedia terminals MTA, MTB for a PABX with a distributed architecture.
Figure 15B:
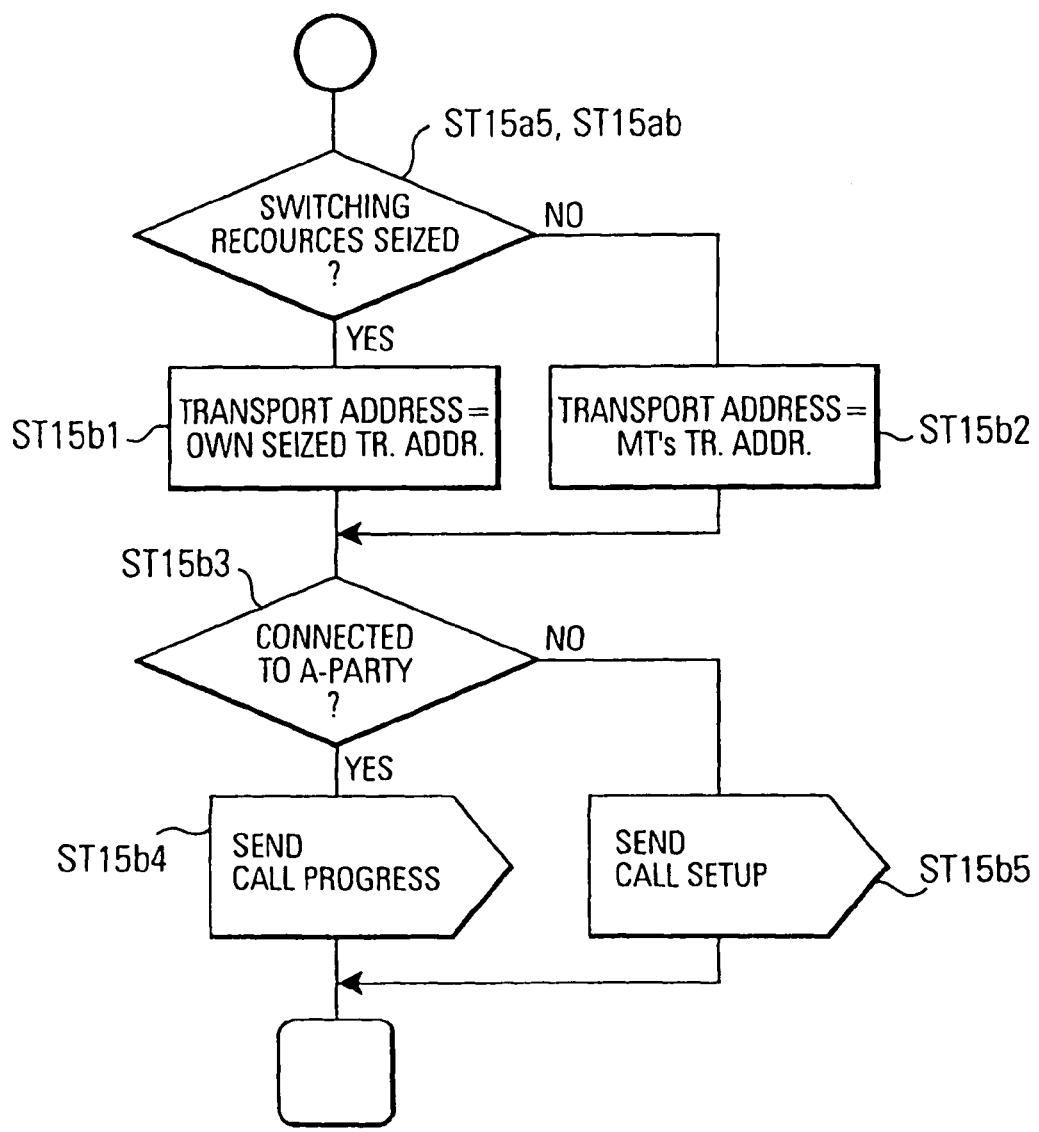
FIG. 15b shows a flow chart illustrating the decision process when sending messages in FIG. 15a for setting up a call between two multimedia terminals MTA, MTB, in particular to decide the media transmission path to use for the communication and also to instruct a given multimedia terminal to uses the set-up path subsequently.
Figure 15C:
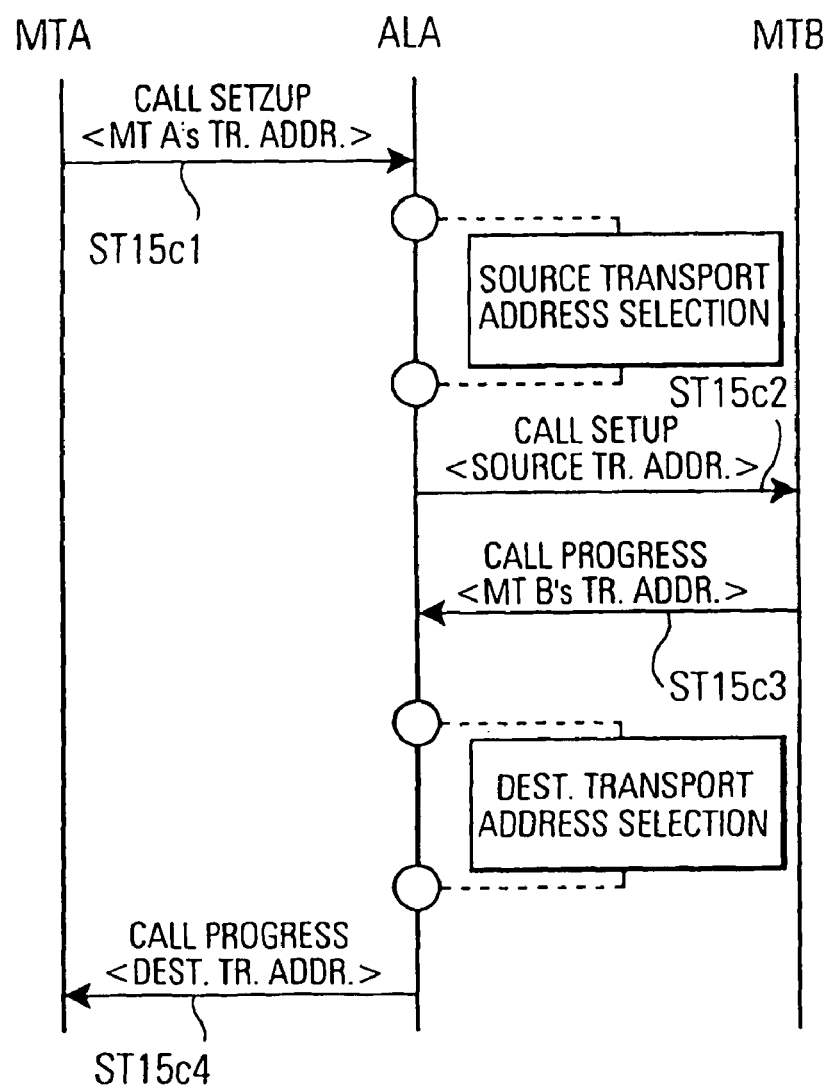
FIG. 15c a call setup diagram similar to FIG. 15a where ALA and ALB are merged into one application layer ALA for a PABX having a none-distributed centralized architecture.
Figure 15D:
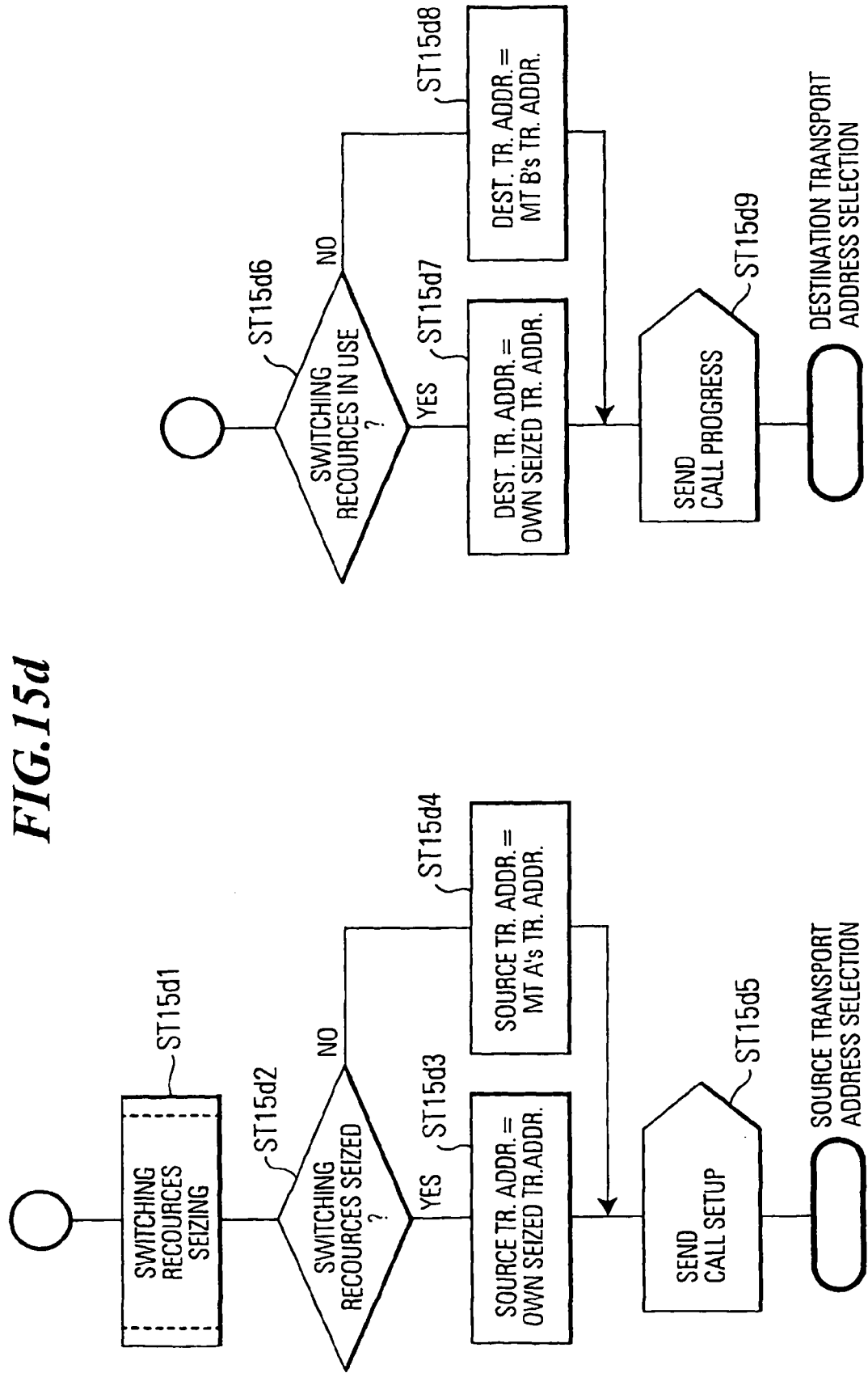
FIG. 15d a diagram for a flow chart similar to FIG. 15b for the none-distributed architecture PABX of FIG. 15c, in particular the source and destination transport address selection.

FIG. 15a shows a signaling diagram of a call set-up between two multimedia terminals MTA, MTB in a PABX with a distributed architecture. The most important aspects of the present invention in FIG. 15a is the internal signaling between ALA and ALB. The moments when a decision about a transport address for media streams that is sent to each MT is taken are marked with black dots. FIG. 15b (where all steps are part of the innovative concept of the invention) shows a flow-chart which is carried out at the black points in FIG. 15a. FIG. 15b in particular shows the signaling that internally takes place in the PABX controller when setting-up a new call using a distributed architecture PABX. In particular, the algorithm in FIG. 15b is used in the application layer means ALA just after step ST15a11 in FIG. 15a and in the application layer means ALB just after step_ST15a6 in FIG. 15a.

In step ST15a1 the multimedia terminal MTA sends a call set-up message including its own transport address to the application layer ALA connected to the multimedia terminal MTA. In steps ST15a2, ST15a3, ST15a4 the application layer ALA forwards the transport address of the first multimedia terminal MTA to the application layer ALB connected to the called multimedia terminal MTB. In steps ST15a5, ST15a6 switching resources of the PABX core switching resources SW are seized. The switching resources seizure algorithm in FIG. 14 is used in the application layer means ALA just after step ST15a5 in FIG. 15a. The algorithm in FIG. 15b is used in the application layer means ALA just after step ST15a6 in FIG. 15a.

As shown in FIG. 15b, after the switching resources are seized in step ST15a5, ST15a6, the application layer ALB performs steps ST15b1 or ST15b2. If the switching resources are seized, i.e. switching resources SW of the PABX are used, the transport address is determined to be the own seized transport address from the protocol handling layer of the multimedia controller MMC. If no resources are seized, then of course the transport address is determined to be the transport address of the called multimedia terminal. That is, when selecting a transport address corresponding to one of the PABX's (i.e. when internal switching resources for one call have been ceased in steps ST15a5, ST15a6) in step ST15b1, it is possible for the application layer AL connected to the MTA to select the transport address that falls within certain PSAP's transport address ranges according to a series of rules. This is most useful when the PSAP are grouped by PCBs, i.e. there are several PCBs in the PABX with one PSAP each. Therefore, the application layer can decide on the basis of the following rules through which PSAP (PCB) the multimedia data streams are to be routed when switching resources are seized.

If several PSAPs are used then the provision of the transport address in step ST15b1 can be based on the less loaded PSAP, the PSAP with the lowest mean load, the PSAP whose physical elements are operational or the PSAP, which has more free connections to the PABX's internal switch. In this way, if one of the PSAPs is overloaded or does not have available connections to the internal PABX's switch (a switch connection) the media data streams can be routed to a different PSAP within the PABX, such that a communication is still possible. Therefore, by providing a special transport address of one of its PSAPs the multimedia controller MMC can route the data streams through different PSAPs when switching resources are seized in order to distribute call-related media information. Therefore, on the basis of the signaling information the multimedia controller MMC does not only determine whether or not switching resources must be used but it can also determine how to distribute the various multimedia data streams through different PSAPs if the switching resources are determined to have to be used.

If in step ST15b3 it is determined that there is already a connection to the calling party (A-party) then a call progress is sent and if it is not connected to the A-party, a call set-up is sent in messages ST15b4, ST15b5. This is also indicated with steps ST15a7 and ST7a8 in FIG. 15a8 in FIG. 15a. In steps ST15a9, ST15a10, ST15a11 the multimedia terminal MTB responds with its transport address and likewise at the black point the transport address determination in FIG. 15b is repeated (the algorithm in FIG. 15b is used in the application layer means ALA just after step ST15a11 in FIG. 15a.) That is, also in the reverse direction for the transmission of data from the multimedia terminal MTB to the multimedia terminal MTA a transport address for the possible usage of switching resources of the PABX is determined. Finally, in step ST15a12 the transport address is provided to the multimedia terminal MTA in a called progress message.

FIG. 15d shows a flow chart similar to FIG. 15b for a none-distributed architecture PABX relating to the call setup shown in FIG. 15c. In step ST15c1 a call setup message is sent from the multimedia terminal MTA to the application layer ALA wherein the call setup message contains, as in step ST15a1 in FIG. 15a, the transport address of a multimedia terminal MTA. Then a source transport address selection is carried out as shown in FIG. 15d. First, in step ST15d1 switching resources are seized. The switching resources seizure algorithm in FIG. 14 is used in the application layer means ALA just after step ST15d1 in the application layer means ALA in FIG. 15d. When in step ST15d2 it has been determined that the switching resources have been seized, then the source transport address is to be determined the own seized transport address in step ST15d3. If there are no switching resources seized in step ST15d2, then the source transport address is determined to be the transport address of the multimedia terminal MTA as contained in the call setup message in step ST15c1. In step ST15d5 the call setup message is sent. Then the procedure carries on with step ST15c2 where the call setup message including the determined source transport address is directed to the multimedia terminal MTB. A call progress message is returned in step St15c3. It contains the transport address of the multimedia terminal MTB (i.e. the called multimedia terminal MTB). Subsequently the destination transport address selection is carried out as shown in FIG. 15d.

Similarly, as in step ST15d1, in step ST15d6 it is determined whether there are any switching resources in use. If there are any switching resources in use, then in step ST15d7 the destination transport address is determined to be the own seized transport address. If there are no switching resources in use in step ST15d6, then the destination transport address is determined to be the transport address of the calling multimedia terminal MTA. A call progress message is sent in step ST15d9. Finally, in step ST15c4 the call progress message with the relevant destination transport address is forwarded to the calling multimedia terminal MTA, just like the call progress message in step ST15a12 for the distributed architecture in step 15a.

As explained above with reference to the distributed architecture in FIG. 15a and FIG. 15d and with respect to the centralized architecture in FIG. 15c and FIG. 15d, during a call setup transport addresses of source and destination are exchanged between the two involved multimedia terminals MTA, MTB. When no switching resources are used, then the source and destination transport addresses are merely the source and destination transport addresses of the multimedia terminals MTA, MTB (see for example step ST15d4 and ST15d8 in FIG. 15d). However, if switching resources are used on the calling and/or called multimedia terminal side (e.g. step ST15d2, step ST15d6), then the source or destination address can be the own seized transport address. That is, when switching resources are seized or in use, a transport address corresponding to one of the PABX's own PSAPs can be selected and thus it is possible for the application layer connected to the MTA and/or MTB to select the transport address that falls within a certain PSAP's transport address range according to a series of rules (as explained above), e.g. for distributing the signaling load evenly amongst the PSAPs.

Fifth Embodiment (Supplementary Services)

As explained above, in addition to the discovery and registration of multimedia terminals MT in the extension space of the PABX, also switching resources SW may be seized on the basis of exchanging signaling information with the multimedia terminals MT during the call set-up. There is only no need to seize switching resources if an end-to-end network path can be set-up through the data network, the MT's capabilities are the same or at least matched and the service level in the data network is acceptable. Furthermore, during the call set-up—when switching resources SW must be used i.e. the data streams are at least partly routed through the switching means SW of the PABX—the controller can also determine the transport address of the PSAP through which the signaling and data streams are to be routed.

However, today the PABX networks provide a wide range of supplementary services to its normal telephony terminal users. Since the multimedia terminals MT have been made apart of the PABX extension space, it is also possible to supply supplementary services from the application layer of the PABX to the multimedia terminals MT. Thus, it is not necessary to wait until the multimedia protocol being used describes all these services for implementation in the data network. If the supplementary services of the PABX are to be provided to the multimedia terminal, there must be a mechanism for "escaping" the multimedia protocol to allow the implementation of any supplementary service without regard to the multimedia protocol used.

Said mechanism has the advantage of being portable to different multimedia protocols, i.e the multimedia protocol being used in the PABX might be replaced or a new multimedia protocol might be implemented and supplementary services would still be implemented in a same way. That is, what is meant with "escaping" a multimedia protocol is that the multimedia protocol implementation in the multimedia controller MMC of the PABX is left. For doing so, the mechanism is composed of three phases which are explained hereinafter.

The first phase is the exchange of the transport addresses. Since the supplementary services must be provided by the PABX, the multimedia terminal MT and the PABX exchange transport addresses which can be used during the call for signaling messages related to supplementary services. The supplementary services signaling might be carried out on connection-orientated transport channels or a connectionless transport channels. If a connection-oriented transport channel is used, it is enough if one of the sides, MT or PABX, delivers its transport address to the opposite side. This allows the opposite side to set-up a transport connection to the received address which from the moment the connection is ready can be used for bearing supplementary services signaling.

If a connectionless transport channel is used, both sides MT and PABX must deliver their transport addresses to the opposite side. Both sides will send messages related to the supplementary services to the other sides transport address.

For supplying the supplementary services the MT and the PABX must agree on a type of transport channel to use. This is done by providing a reference for connection-oriented and connectionless transport together with the transport address for supplementary services. In case of a disagreement between the multimedia terminal's preference and the PABX's preference in the type of transport channel, the PABX preference must have presidence over the MR preference. That is, the selected transport channel is dominated by the selection of the PABX.

The transport addresses for supplementary services signaling must be included in the registration messages of the multimedia protocol. This allows the implementation of non call-related supplementary services, since both sides MT and PABX know each other's transport address for the supplementary services even before any call exists between them. That is, the exchange of the transport addresses is on the one hand necessary to have the correct access port (transport address) through which the PABX will supply the supplementary services and on the other hand the PABX must have information (transport address) as to where the supplementary services should be routed.

Figure 16:
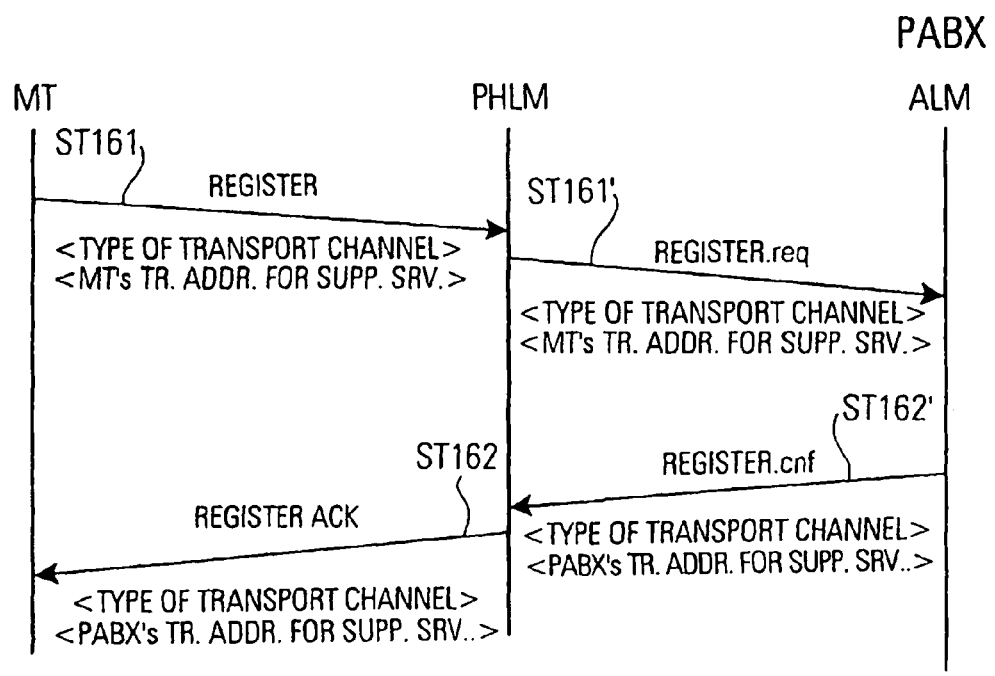
FIG. 16 shows the procedure when the PABX and a given multimedia terminal MT exchange each other's transport addresses used to exchange a special signaling related to the use of supplementary services.

The fifth embodiment of the invention relates to claim 14. The transport address exchange algorithm is illustrated in FIG. 16. In FIG. 16 the most important aspect of the invention is the inclusion of transport addresses for supplementary services in the respective signaling messages.

In step ST161, ST161' the multimedia terminal MT sends a registration message to the PABX controller MMC, i.e. to its application layer ALM through the protocol handling layer PHLM. It indicates a type of transport channel and the transport address of the multimedia terminal to which the supplementary services should be provided. The PABX controller MMC responds with a registration acknowledge message in step ST162', ST162 indicating a type of transport channel and the transport address of the PABX through which supplementary services can be routed. The procedure in steps ST162 can be carried out repeatedly until the same type of transport channel is agreed upon by the MT and the PABX. In FIG. 16 the information associated to the messages is that related to the supplementary services channel only. Other information not reflected in FIG. 16 may be included in the messages. For example, the messages ST161 and ST162 can also be combined with the registration messages ST13*a*1, ST13*b*1 and the steps ST13*a*8, ST13*b*9 in FIGS. 13*a*, 13*b* during the initial discovery and registration.

It should be noted that in the registration acknowledge message ST162 the PABX's transport address for the supplementary services can be omitted if the PABX decided to use a connection-oriented transport channel.

Furthermore, it should be noted that the transport address selected by each side for supplementary services signaling must not be the same as any other transport address already selected or by some means reserved for use by the multimedia protocol. Therefore, even if the supplementary services transport address registration is combined with the discovery and registration procedures in FIGS. 13*a*, 13*b*, it must be ensured that the transport address used for the signaling for a call set-up is not the same as the transport address for signaling relating to supplementary services.

After agreeing upon the transport addresses through which the supplementary services are respectively routed in the multimedia terminal MT and the PABX controller MMC, the second step is the opening of the agreed upon transport channel for the supplementary services signaling. Once the transport address exchange process is finished, the channel for exchanging signaling related to supplementary services is therefore opened. For example, if a connectionless transport channel has been agreed upon the channel is considered implicitly opened from the moment both sides MT and PABX controller have received the transport address for supplementary services signaling from the other side. If a connection-oriented transport channel is agreed upon, the PABX controller must open a transport connection towards the transport address of the multimedia terminal MT called MT or calling Mt for supplementary service at some moment after sending the registration acknowledgement message in step ST162 (and preferably not before, since until the reception of the registration acknowledge message in the multimedia terminal, the multimedia terminal MT does not know anything about the selected transport channel).

That is, the AL must open a transport connection to any MT (called or calling) with which it has been agreed to use a connection-oriented channel for the supplementary services. It might happen that the channel to one of the MTs (called or calling) is a connectionless channel, and the channel to the other MT is a connection-oriented channel.

After opening the supplementary services channel, the third step is the actual exchange of supplementary services signaling. That is, once the transport channel is open, either implicitly or explicitly by the PABX controller, at any moment any side, the MT or the PABX, can send a signaling message related to a supplementary service through this set-up channel. Two types of messages can be exchanged through this set-up transport channel.

A first type are terminal-updating messages. These messages are sent by the PABX and are received by the MT when supplementary services signaling is exchanged. These messages convey information related to the state and visual indicators of the terminal. The information that can be conveyed by these messages include the following fields.

change of call state:
in this case the multimedia terminal MT changes its call state (idle, occupied etc.) to the one which is conveyed in the terminal update message received from the PABX.

display update:
the multimedia terminal MT shows the conveyed information on its display.

user interface:
information related to the user interface that must be presented by the multimedia terminal MT, depending on the call state.

The second type of messages are service request messages. These messages are sent by the multimedia terminal MT and are received by the PABX controller. In these signaling messages service requests done by means of user actions on elements of the multimedia terminal's user interface or spontaneously generated by the multimedia terminal MT are transported to the PABX controller. These service requests can be performed by the multimedia terminal MT in two ways:

stimulus:
the services which is requested with the service request must be identified by the PABX controller. In this case the PABX controller identifies a supplementary service based on the service request.

functional:
the multimedia terminal MT identifies the service which is to be requested.

As explained above, since the multimedia terminal MT and the PABX exchange information regarding the transport channel and the transport address to be used for the supplementary services signaling, supplementary services can be provided from the PABX also to the multimedia terminal.

Furthermore, it should be understood that although the specific usage of the entities in FIGS. 5, 6, 7, 8, 9 is not described with reference to the flow charts in FIGS. 16, 15b, 15a, 15c, 15d and FIG. 14, a skilled person immediately realizes on the basis of the above description that the physical signals, i.e. the data streams and the signaling messages must be routed to the special transport address of the PSAP as shown in FIG. 6. It is actually the construction of the controller MMC with its layer structure which allows to make the multimedia terminal MT an extension of the PABX extension space, allow a registration and discovery, the seizure of switching resources as well as the usage of supplementary services from the PABX. In all cases, once the multimedia terminal MT is registered in the PABX controller the seizure or use of switching resources (including supplementary resources) is made on the basis of interpreting signaling information received from one or more connected multimedia terminals MT.

Sixth Embodiment (Network Resources Management)

As is well-known, in a multimedia data network network control messages can be used for network resource management purposes. Such network resource management can for example include the adaption of transfer rates of an ongoing call or other call related adjustments. In a data network the RSVP (Resource reservation Protocol) Protocol can be used for such network resource management purposes.

Since the multimedia terminals MT have been made to extensions of the normal PABX extension space, according to a fifth embodiment of the invention the multimedia controller MMC according to the invention also provides the possibility to handle such network resource management messages if the multimedia protocol in the data network in use supports such messages for network resource management. Then, the application layer device AL of the multimedia controller MMC can become a network resources manager on behalf of the multimedia terminals MT for managing resources also in the data network. That is, the application layer manages packet switched network resources.

If the multimedia terminal wants to use some resources of the data network, it must request the use of such resources at the PABX multimedia controller MMN. These requests for resources must be made by the multimedia terminal MT when either it starts a new call or it tries to increase the information transfer rate of an ongoing call. Likewise, when the multimedia terminal MT does not want the used resources anymore, it must inform the PABX controller of this fact. Therefore, the multimedia terminal MT must send a message to the PABX controller to drop a call or to decrease the information transfer rate of an ongoing call.

In the PABX the multimedia controller MMC must upon reception of these request messages from the multimedia terminal MT execute an algorithm that determine whether the requesting multimedia terminal MT has an authorization for such an request. If the multimedia controller determines that the multimedia terminal MT has such authorization, then the multimedia controller must interact with the network elements in the underlying multimedia data network in order to seize or release packets switched resources as requested through the messages by the multimedia terminal MT.

In case one ore more of the network elements involved in the call were not available to provide the requested resources the multimedia terminal MT must notify the PABX about this fact. The PABX controller must then notify back to the multimedia terminal MT whether or not the request could be fulfilled. The PABX controller can use a series of checks in order to decide whether to proceed with the multimedia terminal's request. These checks could include the following:

- the multimedia terminal's O&M-assigned category allows it to request more resources;
- the multimedia terminal's O&M-assigned category allows it to have the number of resources requested;
- the class of call being transferred to by the resources request deserves the requested resources; and
- measurements on the data network status indicate if it is possible to fulfill the resource request.

Figure 17:
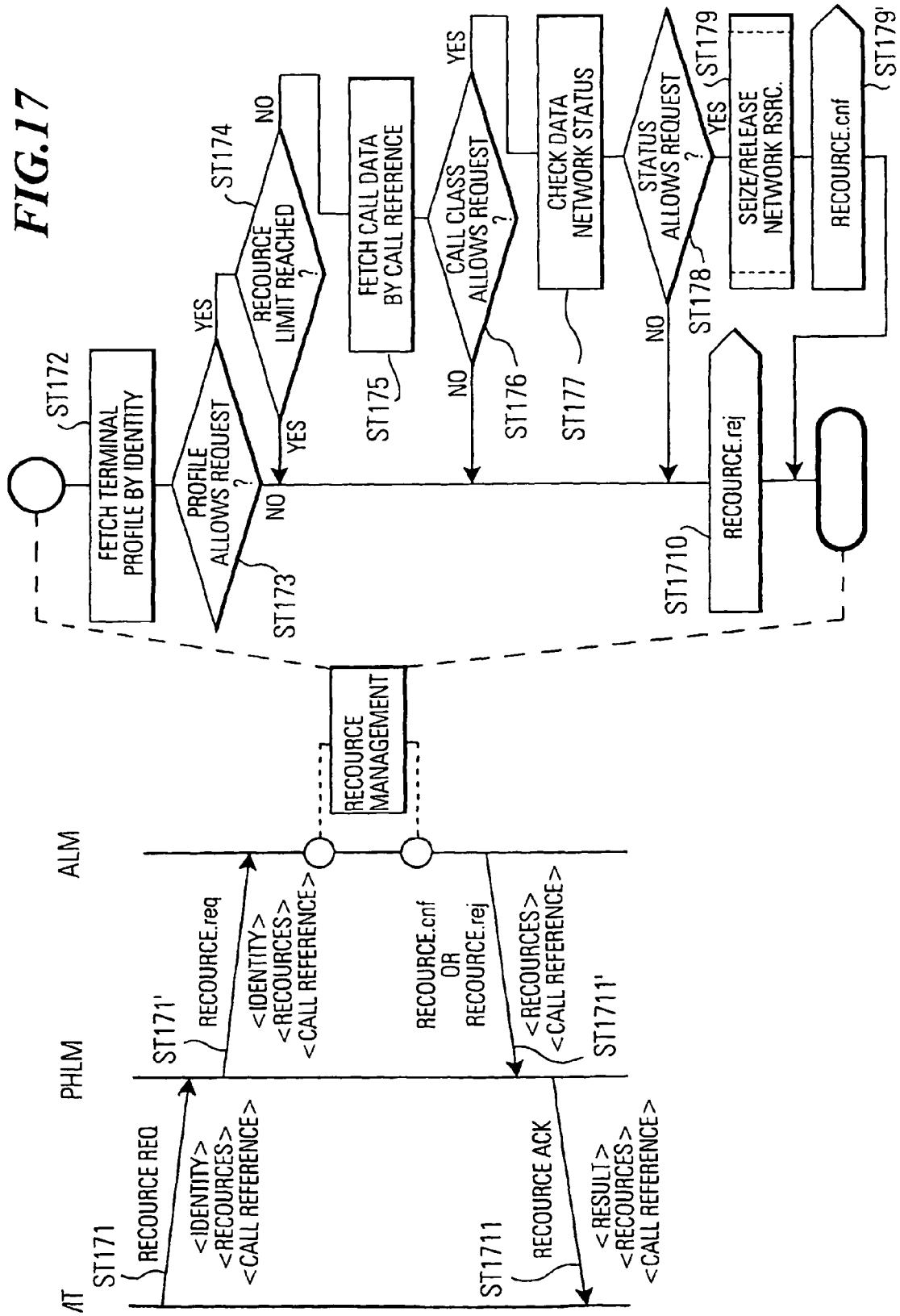
FIG. 17 shows a algorithm for a network resources management which allows the PABX to determine signaling whether network resources are available for carrying out a given communication.

The sixth embodiment of the invention relates to claim 15. This procedure is illustrated in FIG. 17. The most important aspect in the procedure in FIG. 17 is the resource management algorithm. In step ST171, ST171' the multimedia terminal MT sends a resource request message including its identity, the requested resources and optionally a call reference if a call is already ongoing. The resource request message in step ST171 is provided to the transport address of the application layer ALM of the PABX controller through the protocol handling layer PHLM.

In step ST172 the first thing the PABX controller does is to fetch the category (terminal) profile by the identity. What is meant with category profile is to check in the data structure of the multimedia terminal MT whether the multimedia terminal MT is allowed to send such resource management messages, i.e. whether the multimedia protocol in use in a multimedia data network supports such messages. This can be more easily understood by viewing the "Category Profile" as a "Terminal Profile". The Terminal Profile is the information that contains, between other data, the operations and services this terminal is allowed to request. For instance, the Terminal Profile holds the information that states whether that terminal is allowed to do public calls.

For MTs, the Terminal Profile includes also information about whether the MT is allowed to have resources reserved in the data network for certain types of calls, and if so, what is the maximum amount of resources that are allowed to reserve for such call. The "check" as such is not the Terminal (Category) Profile. The "check" is done in FIG. 17, ST173, and it is done by looking into the Terminal Profile at the information that states whether the terminal to which this profile is associated has the right to have resources reserved.

If the profile does not allow the request in step ST173, then the resource management is rejected in step ST1710. If the profile allows resource management massages in step ST173, then it is first decided in step ST174 whether the resource limit has been reached already. If the resource limit has already been reached, then of course no further adjustment can be made. Therefore the resource request is rejected again in step ST1710.

If there are still free resources which can be managed in step ST174, then in step ST175 the multimedia controller MMC fetches call data by call reference. This is necessary to check whether the particular type of call which is currently ongoing relates to a call class which allows network resource management requests. A call reference is used to identify the call for which the network resources should be managed. If the call class determined in step ST175 allows the network resource management request in step ST176, then the data network status is checked in step ST177. If the status of the data network, i.e. its underlying multimedia protocol, allows adjustment of the network resources, then in step ST179 network resources can be seized and released in accordance with the request made in the resource management request message sent in step ST171. Therefore, a confirmation is determined in ST179' and a resource confirmation message is returned in step ST1711'. A resource management acknowledgement message including the result of the resource adjustment, the resources and the call reference is sent back to the requesting multimedia terminal MT in step ST1711.

The method by which the PABX requests resources to the underlying data network can be any new or already known method understandable by the network elements of the data network and this seizure and release is carried out in step ST179. The network resources request method is out of the scope of this invention but as an example, if the network element support the aforementioned RSVP protocol, then the PABX controller can send a RSVP request message to the called multimedia terminal MT. This causes the network elements along the path to the called multimedia terminal MT to reserve resources for that call. This approach chosen in H.323v2 and SIP.

Note that the aspect according to the fifth invention is the process by which the PABX controller decided whether network resources can or cannot be granted and if it can how much of them. For doing so, the PABX controller can process the received resource request messages and decide whether or not further resources can be seized or must be released. Once more, the network resource management message in step ST171 is directed as a type of signaling message to a specific transport address of the application layer AL.

Therefore, in addition to the registration, discovery, basic call set-up and supplementary services used, the PABX controller according to the invention can not only control the switching resources SW of the PABX network for the call set-up but can also control the network resources of the data network to which the multimedia terminal MT is connected. All this is possible because the multimedia controller MMC according to the invention has a layer structure which mirrors the layer structure of the multimedia data network. Therefore, it can issue the aforementioned RSVP message for the adjustment of the network elements which are located on the path to the multimedia terminal MT.

Seventh Embodiment (H.323 Gatekeeper/Gateway Integration)

With reference to FIGS. 18–21, an example case of the invention described in the previous sections will be explained. The use case consists of an H.323 Gatekeeper/Gateway application integrated in a PABX system. The following means are added to the PABX in order to enable the connection of multimedia terminals MTs to it:

An Access PCB (APCB) which implements the whole Access Layer means ALM as described above and shown in FIGS. 6, 7 and the Media Gateway block MGM as described above and shown in FIG. 9a;

The database DB (MTDB: multimedia data base) for holding the MT specific information (MT's data structures) as described and shown on the right side of FIG. 13c;

A SW (switch) block (OMP) which implements the O&M Layer as described above and shown in FIG. 11;

A SW (switch) block (LP) which implements the Protocol Handling layer PHLM as described above and shown in FIG. 8, the Media Controller block MCM as described above and shown in FIG. 9a and the Application layer ALM as described above and shown in FIGS. 6, 7.

Figure 18:
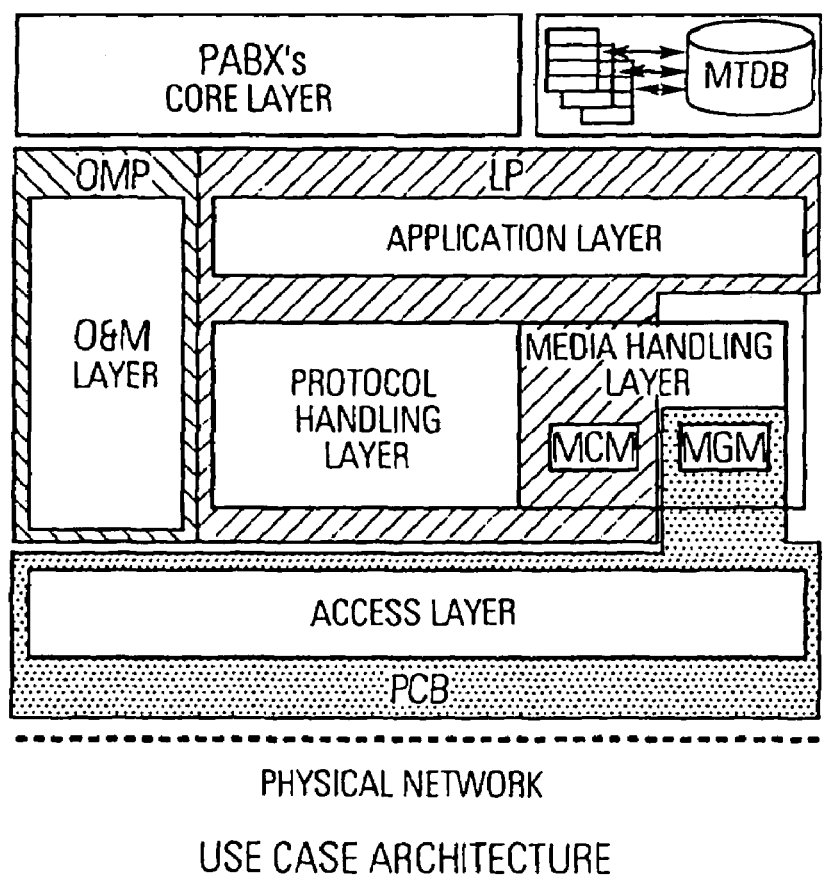
FIG. 18 shows a use example with a H.323 Gatekeeper/Gateway application integrated into a PABX, in particular the architecture of the layer implementation.
Figure 19:
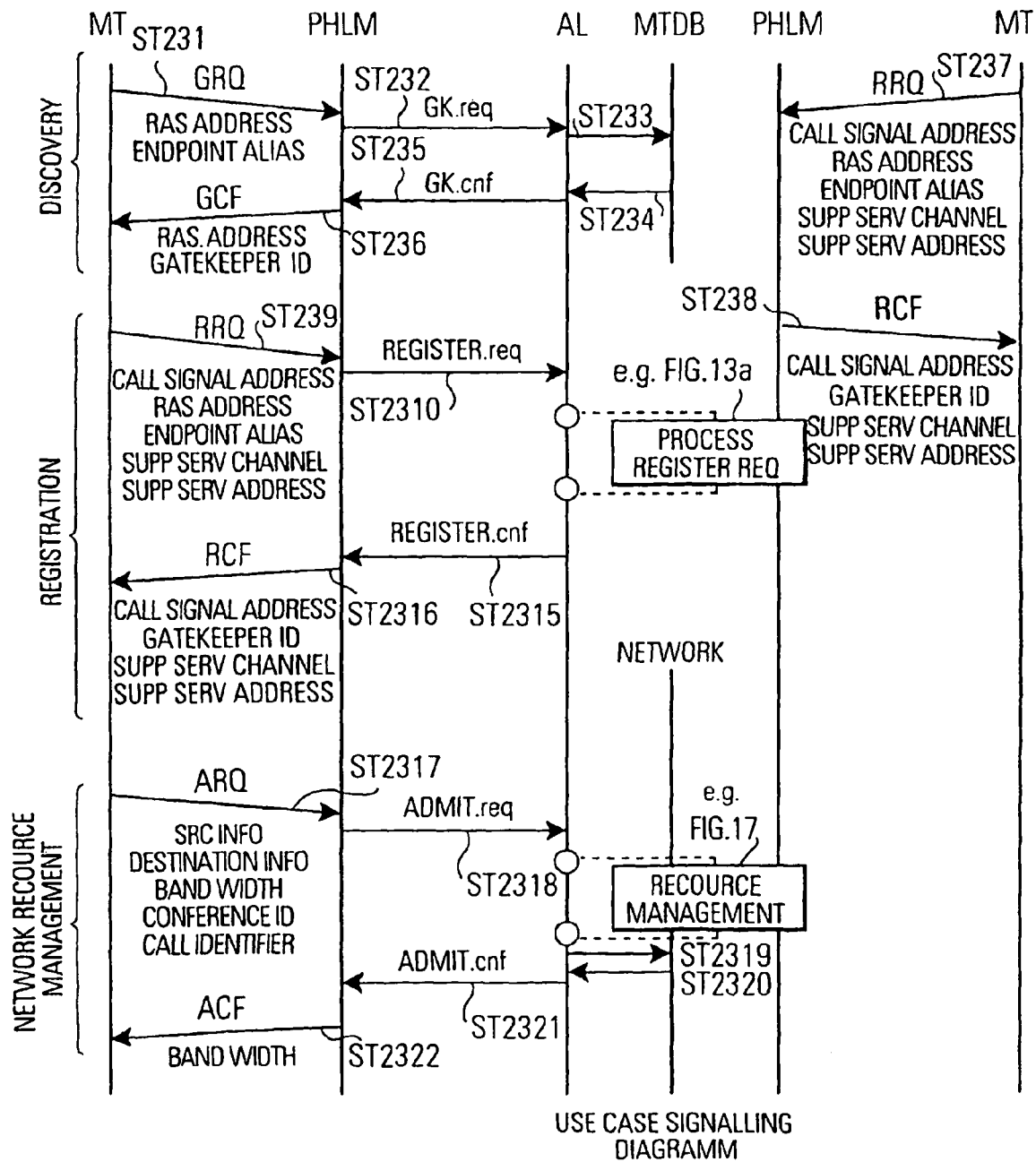
FIG. 19 a signaling diagram where the multimedia terminal MT on the left is performing a discovery and a registration procedure and where the multimedia terminal on the right is performing a registration procedure only, also showing a part of the call setup procedure between the two multimedia terminals MTs.

In FIG. 18 the architecture of the implementation is shown. As explained above, before being able to start using the PABX's switching resources, the multimedia terminals MTs must carry out a registration procedure similar to that described in the third embodiment and shown in FIGS. 13b, 13c. Optionally, before the registration the multimedia terminals MT may start a discovery procedure similar to that described in the third embodiment (automatic discovery) and shown in FIG. 13a. In FIG. 19 the multimedia terminal MT on the left side performs a discovery as well as a registration processes, whilst the multimedia terminal MT on the right side performs only the registration process. Once correctly registered, multimedia terminals MTs can make and receive calls.

Figure 20:
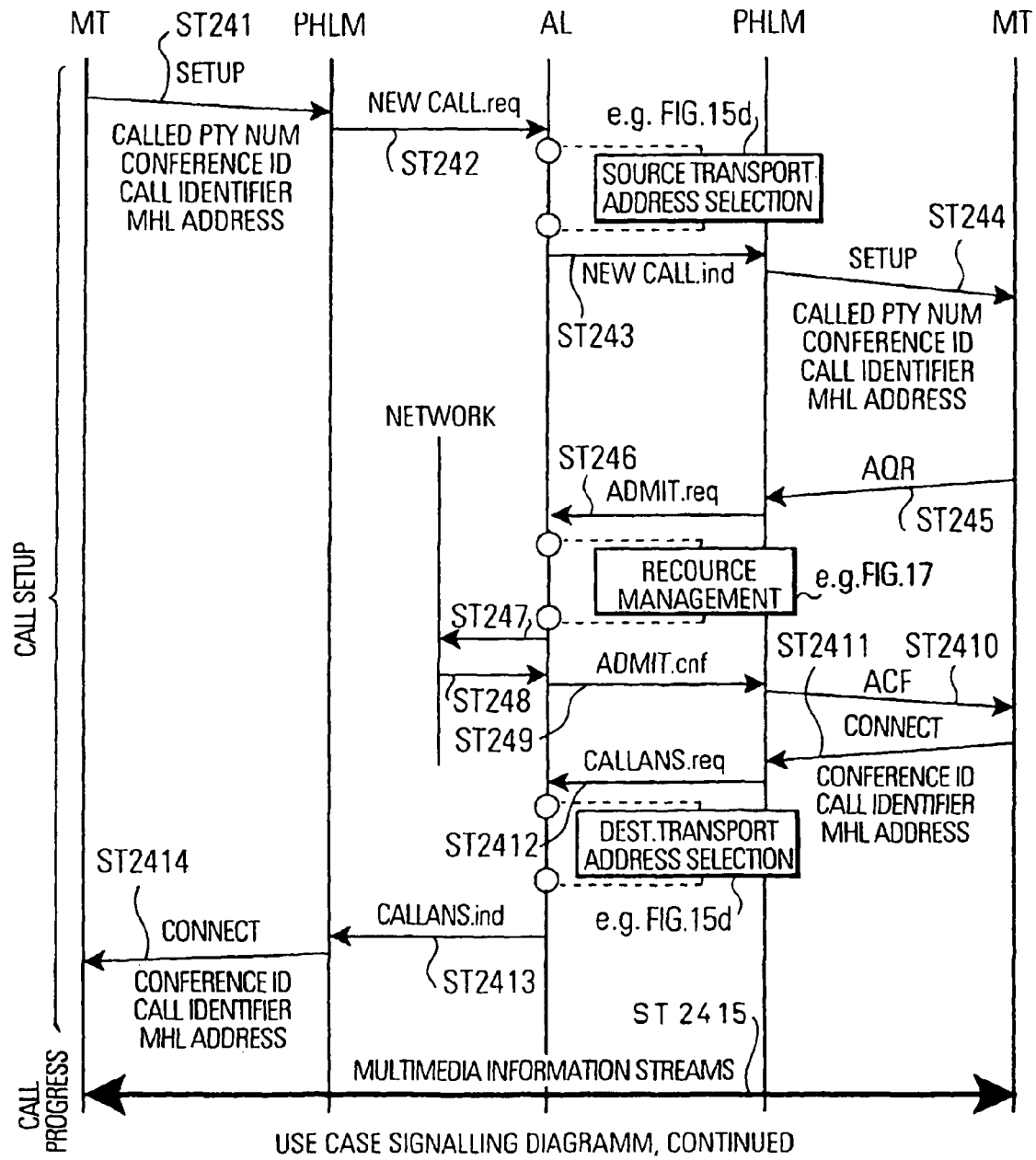
FIG. 20 shows a continuation of the call setup signaling of FIG. 19.
Figure 21:
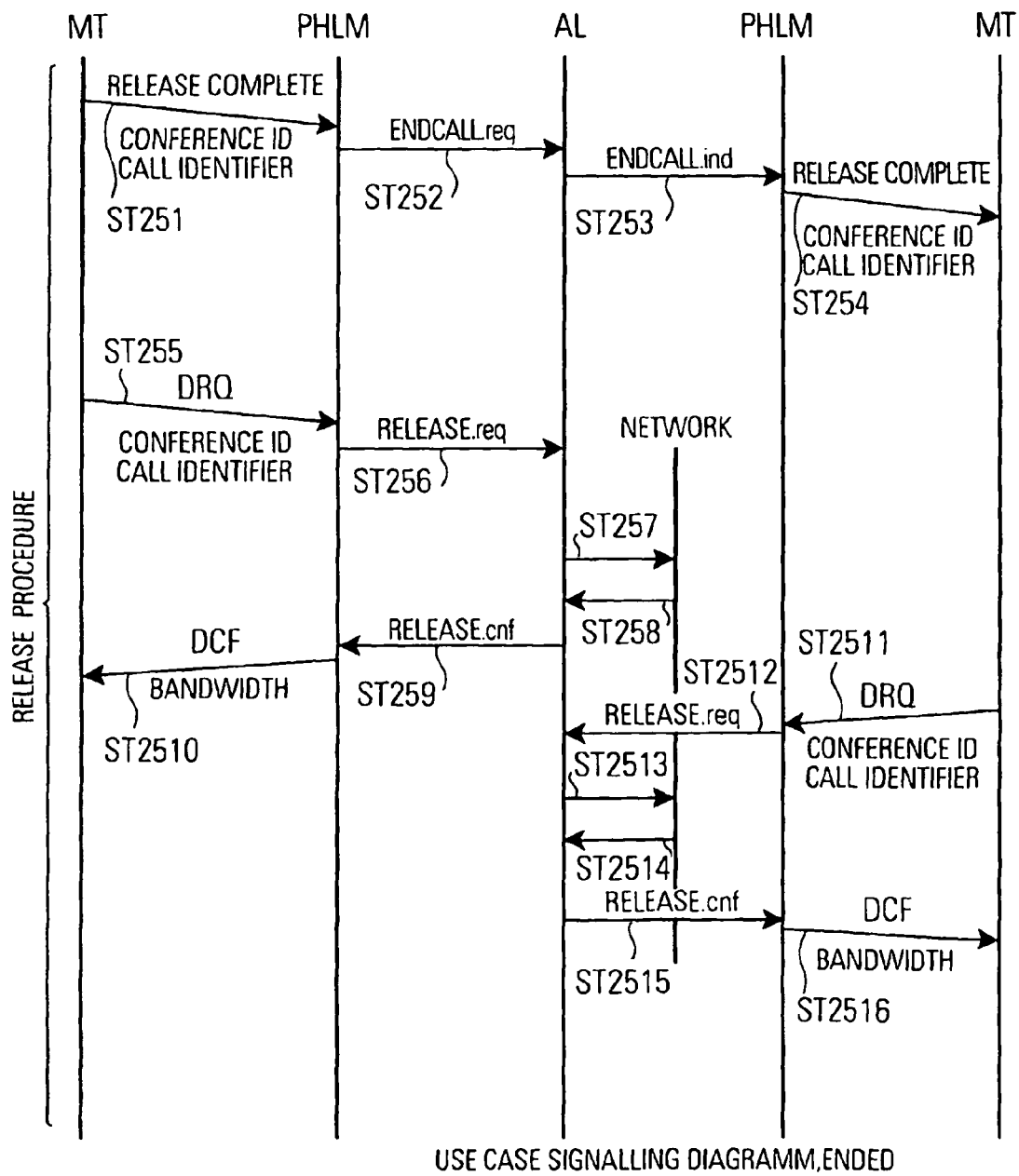
FIG. 21 shows a call release procedure for the call setup in accordance with FIGS. 19–20.

In FIGS. 19, 20 the process of a MT to MT call setup is illustrated. As can be seen in the figure, for this call the result of the execution of the algorithm shown in FIG. 14 is that switching resources SW in the PABX are not seized, since after execution of said algorithm it can be assured that an end-to-end path through the underlying data network is possible to be set-up a call between the two multimedia terminals MTs. Finally, the call is released according to FIG. 21.

Signals from AL to MTDB are for querying the MTDB contents.

Signals from AL to Network are for seizing or reserving data network resources for the call that is about to be established.

The following description is a step-by-step description of the discovery, registration, call setup and call release processes as was above described more generally for the individual procedures. However, a clear coherence exists between the embodiments described above and the example case described here which is currently be regarded by the inventors as the best mode of the invention.

Discovery Process

Step ST231 is the H.323 counterpart of step ST13a1. The MT on the left side sends a Discovery Request message GRQ with its identifiers (endpointAlias) and the transport address TA to which the Discovery Confirm or Discovery Reject message must be sent by the receiving application layer AL. This message is sent by said MT to the well-known discovery multicast address defined in H.323, which is 224.0.1.41:1718 in TCP/IP networks. Steps ST232/ST235 are the same Application Primitives as in steps ST13a1'/ST13a8' in FIGS. 9a, 9b.

Steps ST233/ST234 represent a query to the MT database to check the identities provided by the discovering MT against the MT database contents.

Step ST236 is the H.323 counterpart of ST13a8. The PHLM maps the Application Primitive in step ST225 to a Gatekeeper Confirm message GCF with the transport address TA to which the MT must send its further Register Request message (rasAddress), and an identifier of the Gatekeeper/PABX (gatekeeperId). This message is sent to the transport address TA received in step ST231 (rasAddress).

The transport address TA sent in step ST236 will have been chosen by the application AL between all those transport addresses TAs known by said application layer AL, either corresponding to own PSAPs or foreign PSAPs, and can preferably be selected according to criteria mentioned in the third embodiment.

Registration Process

Step ST239 is the H.323 counterpart of step ST13b1 and step ST161. The multimedia terminal MT on the left side sends a Register Request message RRQ with its identifiers, user and password (endpointAlias), its dynamic transport addresses TAs used for non call related signaling (rasAddress) and call related signaling (callSignalAddress), and the type and transport address TA of the channel used for Supplementary Services (suppServChannel and SuppServAddress).

Steps ST2310/ST2315 are again the same Application Primitives as steps ST13b1'/ST13b9' in FIG. 13b. Steps ST2311/ST2312 represent a query to the MT database to check the identities provided by the registering multimedia terminal MT against the MT database contents.

Steps ST2313/ST2314 represent the MT database update consequence of the received data related to the registering MT (rasAddress, callSignalAddress, suppServChannel and suppServAddress).

Step ST2316 is the H.323 counterpart of ST13b9 and ST162. The PHLM maps the Application Primitive in step ST2315 to a Register Confirm message RCF with the Gatekeeper's transport address TA for call related signaling (callSignalAddress), an identifier of the Gatekeeper/PABX (gatekeeperId), and the Gatekeeper's type of channel and transport address TA for Supplementary Services signaling (suppServChannel and suppServAddress).

The transport addresses TAs sent in step ST2316 are preferably chosen by the application layer AL between all those transport addresses TAs known by said application layer AL, either corresponding to own PSAPs or foreign PSAPs, and selected according to criteria mentioned in the third embodiment.

Of course, the multimedia terminal MT on the right side in FIG. 19 also carries out a Registration process (steps ST237 and ST238). This process causes a signaling exchange equal to that between steps ST2310 and ST2315 which has been ommitted in sake of picture clarity.

Network Resource Management

Prior to starting a new call, the multimedia terminal MT requests the Gatekeeper to reserve some network resources in the underlying data network for holding said call. Step ST2317 is the H.323 counterpart of step ST171. The multimedia terminal MT on the left side sends an Admission Request message ARQ with its identifiers (srcInfo), called party identifiers (destinationInfo), identifiers for the call (conferenceID and callIdentifier) and number of resources necessary (bandwidth). This message is sent to the transport address TA used for non call related signaling of the Gatekeeper (rasAddress in step ST236). Steps ST2318/ST2321 indicate the same Application Primitives as ST171'/ST1711' in FIG. 17.

Steps ST2319/ST2320 represent an interaction between the application layer AL and the underlying data network in order to negotiate seizing or reservation of resources in said data network. This interaction is dependent on the type of network (TCP/IP, AAL5/ATM etc.) and the way in which said network handles resources (RSVP, DiffServ, ATM QoS etc.).

Step ST2322 is the H.323 counterpart of step ST1711. The PHLM maps the Application Primitive in step ST2321 to an Admission Confirm message ACF with the actual number of resources that have been seized or reserved in the data network (bandwidth). The called multimedia terminal MT also goes through this process when receiving the call setup notification. This is described in the Basic call setup section below.

Basic Call Setup

Step ST241 is the H.323 counterpart of step ST15c1. The multimedia terminal MT on the left side sends a call setup message (setup) with the called party E.164 number (calledPtyNum), identifiers for the call (conferenceID and callIdentifier) which must match those which the multimedia terminal MT sent in step ST2217, and the transport address TA used by said multimedia terminal MT to receive packets bearing multimedia information (MHLAddress). This transport address TA has the same meaning as the <MT A's Tr. Addr.> field in step ST15c1.

Steps ST242/ST243 are the Application Primitives corresponding to the call setup message (setup), which were not shown in FIG. 15c for clarity.

Step ST244 is the H.323 counterpart of step ST15c2. The MHLAddress in step ST244 might be that sent by the calling MT in ST241, or a different one selected by the application layer AL during execution of the method in FIG. 15d. This address has the same meaning as the <Source Tr. Addr.> field in step ST15c2.

The signaling between step ST245 and step ST2410 is similar to that between step ST2217 and step ST2222. The called multimedia terminal MT also requests from its Gatekeeper the number of underlying data network resources which it is going to need for the call (it might be that a different number of resources is needed in each direction, for instance if the calling multimedia terminal MT sends only an audio stream while the called multimedia terminal MT sends both an audio and a video stream).

Step ST2411 is the H.323 counterpart of step ST15c3. The multimedia terminal MT on the right side sends a call connection message (connect) with identifiers for the call (conferenceID and callIdentifier) and the transport address TA which this MT wishes to use for receiving packets bearing multimedia information (MHLAddress). This transport address TA has the same meaning as <MT B's Tr. Addr.> field in steps ST15c3.

Steps ST2412/ST2413 are the Application Primitives corresponding to the call connect message (connect), which were not shown in FIG. 15c for clarity. Step ST2414 is the H.323 counterpart of step ST15c4. The PHLM maps the CALLANS.ind Primitive to a call connect message (connect) with the identifiers for the call (conferenceID and callIdentifier) and the transport address TA to where the calling multimedia terminal MT must send its packets bearing multimedia information.

The MHLAddress in step ST2414 might be that sent by the called multimedia terminal MT in step ST2411, or a different one selected by the AL during execution of algorithm in FIG. 15d. This address has the same meaning as the <Dest. Tr. Addr.> field in step ST15c4.

As can be seen from the above description, now both calling and called multimedia terminal MT know the transport addresses TAs to which they must sent their packets bearing multimedia information. In this use case, MHLAddress fields sent by multimedia terminals MTs have not been modified by the application layer AL since said application layer AL has found that en end-to-end signaling path can be setup between calling and called multimedia MT through the underlying data network. Therefore the transport addresses TAs which both multimedia terminals MTs must use for sending multimedia streams are each respective MT's transport address TA, and the multimedia streams flow directly between the MTs without traversing through the PABX's switch, as can be seen in step ST2415.

Call Release

Signaling between steps ST251 and ST254 is the standard H.323 signaling for releasing a call. The calling multimedia terminal MT (the called multimedia terminal MT can also release the call) sends a call release message (releaseComplete) via the mapping and the corresponding Application Primitives through the to the application layer AL to arrive at the the called multimedia terminal MT. The releasing multimedia terminal MT identifies the call to release by including call identifiers (conferenceID and callIdentifier) in the releaseComplete message. Signaling between steps ST255 and ST2510, and between steps ST2511 and ST2516 have a function opposite to that of signaling between steps ST2317 and ST2322, and between steps ST245 and ST2410. Both multimedia terminals MTs notify their Gatekeepers (in this case both MTs are using the same Gatekeeper) that the data network resources used for the call that is being terminated can be released.

It should be noted that in the description of the above use example all denotations in steps between the multimedia terminals and the respective layers PHLM and AL designate messages containing one or more parameters whilst the steps between the layers e.g. PHLM and AL in capital letters designate the exchange of the primitives as already explained above with reference to FIGS. 6–9. This also applies to the figures with the other flow charts e.g. in FIGS. 13*a*, 13*b*, 14, 15*a*, 15*c*, 16, 17.

INDUSTRIAL APPLICABILITY

As explained above, rather than using a gateway the present invention incorporates in a circuit switched network a multimedia controller which allows to handle the multimedia terminal MT connected to the data network connected to the circuit switched network to be treated just like any other normal telephony terminal extension. For doing so, the controller mirrors at least part of the protocol layer structure normally used in the data network. If a new data network having a different type or standard of multimedia protocol is connected to the PABX then only specific procedures in the individual layers of the controller need to be updated/replaced.

For call set-up requests from multimedia terminals MT which are now part of the extension space of the PABX the multimedia controller receives signaling messages in the multimedia data format, decodes these signaling messages and controls the use of switching resources of the PABX in accordance with the content of the signaling messages.

By exchanging transport addresses with the multimedia terminal MT the PABX multimedia controller can perform distribution of the signaling load and of the call-related media information between a number of different physical service access points PSAP which are part of the physical and data link sublayer.

The multimedia controller can also provide supplementary services of the PABX network to the multimedia terminal MT when a corresponding exchange of signaling messages is performed between MT and multimedia controller.

Finally, if the protocol used in the data network supports this, also network resource management functions can be carried out by the PABX multimedia controller.

As explained above with reference to the layer structure of the inventive PABX multimedia controller, whenever a new protocol is used in the data network, it is only necessary to exchange certain algorithms in the layer structure without replacing the complete controller. It is also possible that several algorithms coexist in each of the layers such that even when a new multimedia protocol data network is connected an automatic selection of the appropriate algorithm/sublayer is performed.

Therefore, it should be understood that the present invention is by no means restricted to the usage of specific protocols like IPX, H.323, PCP/IP etc. Quite to the contrary, on the basis of the above teachings various modifications and variations of the present invention can be carried out on the basis of the teachings disclosed herein. In particular, the invention can comprise embodiments consisting of features which have been separately described in the claims and/or in the description. Furthermore, it should be noted that what has been described above is only what the inventors presently conceive as the best mode of the invention and further advantageous embodiments may be devised on the teachings diclosed herein. Therefore, the scope of the invention is not restricted to the description.

Furthermore, reference numerals in the claims only serve clarification purposes and are by no means intended to be restricting the scope of these claims.

The invention claimed is:

1. A circuit switched Private Branch Exchange System (PABX) comprising switching resources (SW) for providing communications between first subscriber stations (TT) belonging to the circuit switched extension realm of said system, characterized by:
   a multimedia controller multimedia controller (MMC) adapted to control said switching resources (SW) for providing communications between a first subscriber station (TT) and a second subscriber station (MT) of a Multimedia Data Network (MMN), or between second subscriber stations (MTs), the multimedia controller (MMC) comprising:
   a) Access Layer means (ALM), containing a plurality of physical and data link sub-layers (PDLSUB) and a Network and transport sub-layers (NTSUB), for connecting the multimedia controller (MMC) with the data network where the second subscribers are connected;
   b) Protocol Handling Layer means (PHLM), for processing the multimedia protocol messages that are exchanged with a second subscriber related to a communication that involves, at least, a second subscriber;
   c) Media Handling Layer means (MHL), for handling processes related to media exchange with a second subscriber related to a communication that involves, at least, a second subscriber;
   d1) Operation and Maintenance Layer means (OML), for setting and storing a data structure related to each admissible second subscriber, said data structure comprising for each admissible second subscriber a directory number belonging to the PABX's number space, and one data or any combination thereof among:
   network identification and addressing data,
   multimedia capabilities data, security information data,
   d2) said Operation and Maintenance Layer means (OML) comprising means for setting (ST121–ST125) in a database (DB) the relationship between a multimedia terminal's data structure and said directory number;
   e1) Application layer means (AL) for controlling the underlying layers Access Layer means (ALM), Protocol Handling Layer means (PHLM) and Media Handling Layer means (MHL), the AL interfacing with control blocks in the PABX (COL), and comprising means for processing basic services (BSM) for supplementary services (SSM), and e2) said Application Layer means (AL) comprising means for receiving a protocol message from one of said first or second subscriber stations in the form of a primitive to interpret said primitive, to perform control of said switching resources (SW).

2. A method for integrating in the extension space of a system as described in claim 1 at least one second subscriber station (MT), the method comprising the steps of (ST121–ST125);
  initiating a new directory number for said second subscriber,
  initiating for said second subscriber a data structure comprising one data or any combination thereof among:
    network identification and addressing data,
    multimedia capabilities data,
    security information data,
  storing said data structure in a database (DB),
  creating a relationship between said new directory number and said data structure.

3. A method according to claim 2 further comprising the following steps for the discovery phase of a second subscriber station (MT) in a system as described in claim 1:
  in said second subscriber station (MT), sending (ST13a1, ST13a1') a discovery message including an identity information of said second subscriber station (MT) to a fixed transport address of a protocol handling layer means (PHLM) of the multimedia controller multimedia controller (MMC); and
  in said multimedia controller multimedia controller (MMC), checking (ST13a2) the identity information against the data structures in said data base (DB) to find a corresponding directory number and, if a match is found, sending (ST13a8, ST13a8') back to said second subscriber station (MT) a confirmation message including a transport address of the protocol handling layer means (PHLM) through which the protocol handling layer means (PHLM) can receive registration admission and status (RAS) messages.

4. A method according to any of claim 3 characterized in that said multimedia controller (MMC) determines the transport address for each discovering or registering second subscriber station (MT) depending on the signaling load of several physical signal access ports (PSAP) of the plurality of physical and data link sub-layer devices (PDLSUB) in said multimedia controller (MMC).

5. A method according to claim 2 further comprising the following steps for the registration phase of a second subscriber station (MT) in a system as described in claim 1:
  in said second subscriber station (MT), sending (ST13b1, ST13b1') a registration request message (REGISTER) including at least an identity information of said second subscriber station (MT) to a transport address of a protocol handling layer means (PHLM) of the multimedia controller (MMC); and
  in said multimedia controller (MMC), checking (ST13b2) the identity information against the data structures in said data base (DB) and, if a match is found, sending (ST13b9) back to said second subscriber station (MT) a registration confirmation message (REGISTER ACK) including a transport address of the protocol handling layer means (PHLM) through which the protocol handling layer means (PHLM) can receive call signalling messages.

6. A method according to claim 5 characterized in that, in said registration request message and said registration confirmation message, said second subscriber station (MT) and the multimedia controller (MMC) exchange transport addresses and the type of transport channel used for exchanging signaling related to supplementary services.

7. A method according to any of claim 2 further comprising the following steps for providing communications in a system as described in claim 1 between a second subscriber station (MT) and a communication counterpart first subscriber station (TT) or second subscriber station (MT):
  in said multimedia controller (MMC), receiving a protocol message requesting a call establishment (CALL SETUP) from a calling subscriber station (MT,TT), said protocol message comprising, at least, an identification for a counterpart called subscriber station (MT, TT) and a transport address where said calling subscriber station can receive media data stream related to said data,
  in said multimedia controller (MMC), determining if said call establishment message comes from a first subscriber station (TT) or from a second subscriber station (MT),
  in said multimedia controller (MMC), determining if said called subscriber station is a first subscriber station (TT) or a second subscriber station (MT),
  in said multimedia controller (MMC), determining if the switching resources (SW) in said system shall be used for said call,
  from said multimedia controller (MMC), sending a protocol message requesting a call establishment (CALL SETUP) to said called subscriber station (MT, TT), said message comprising a transport address where said called subscriber station shall send media data stream related to said call,
  in said multimedia controller (MMC), receiving a protocol message indicating a call progress for said call establishment request (CALL PROGRESS) from said called subscriber station said message comprising a transport address where said called subscriber station can receive media data stream related to said call, and
  from said multimedia controller (MMC), sending a protocol message indicating a call progress for said call establishment request (CALL PROGRESS) to said calling subscriber station said message comprising a transport address where said calling subscriber station shall send media data stream related to said call.

8. A method according to claim 7 characterized in that said multimedia controller (MMC) determines the usage of said switching resources (SW) on the basis of checking (ST142) whether an end-to-end network path is possible (ST142) between the calling and called subscriber station, by checking their respective terminal's coding schemes (ST145) and by checking the data network service level (ST146).

9. A method according to claim 7, characterized in that, when switching resources in said system (SW) are used, the multimedia controller (MMC) determines the transport address of one of several physical service access points (PSAP) in order to distribute call-related media information amongst several physical service access points (PSAP).

10. A method according to any of claim 7 further comprising the following steps for managing the network resources used by a second subscriber station (MT) related to a call in which said second subscriber station is involved:
  in said second subscriber station (MT), sending a data network resource management request message to the multimedia controller (MMC),
  in said multimedia controller (MMC), determining whether a data network resource management is allowed based on the category profile (ST173), the resource availability (ST174), the call class (ST176) and the data network status (ST178), and in said multimedia controller (MMC) issuing data network resource management messages to the data network in accordance with the resource request made in the data network resource management request message issued from the second subscriber station (MT).

* * * * *

UNITED STATES PATENT AND TRADEMARK OFFICE
CERTIFICATE OF CORRECTION

| | | |
|---|---|---|
| PATENT NO. | : 7,187,671 B2 | Page 1 of 2 |
| APPLICATION NO. | : 10/203087 | |
| DATED | : March 6, 2007 | |
| INVENTOR(S) | : Moyano et al. | |

It is certified that error appears in the above-identified patent and that said Letters Patent is hereby corrected as shown below:

In Fig. 14, Sheet 10 of 20, above Tag "ST141" delete "RECOURCES" and insert -- RESOURCES --, therefor.

In Fig. 14, Sheet 10 of 20, for Tag "ST148" delete "RECOURCES" and insert -- RESOURCES --, therefor.

In Fig. 15b, Sheet 12 of 20, for Tag "ST15a5, ST15ab" delete "RECOURCES" and insert -- RESOURCES --, therefor.

In Fig. 15b, Sheet 12 of 20, delete Tag "ST15a5, ST15ab" and insert --ST15a5, ST15a6 --, therefor.

In Fig. 15c, Sheet 13 of 20, delete "CALL SETZUP" and insert -- CALL SETUP --, therefor.

In Fig. 15d, Sheet 14 of 20, for Tag "ST15dl" delete "RECOURCES" and insert -- RESOURCES --, therefor.

In Fig. 15d, Sheet 14 of 20, for Tag "ST15d2" delete "RECOURCES" and insert -- RESOURCES --, therefor.

In Fig. 15d, Sheet 14 of 20, for Tag "ST15d6" delete "RECOURCES" and insert -- RESOURCES --, therefor.

In Fig. 17, Sheet 16 of 20, delete "RECOURCE" and insert -- RESOURCE --, therefor at each occurrence (9).

In Fig. 17, Sheet 16 of 20, delete "RECOURCES" and insert -- RESOURCES --, therefor at each occurrence (4).

In Fig. 19, Sheet 18 of 20, delete "RECOURCE" and insert -- RESOURCE --, therefor at each occurrence (2).

In Fig. 20, Sheet 19 of 20, for Tag "e.g.FIG.17" delete "RECOURCE" and insert -- RESOURCE --, therefor.

UNITED STATES PATENT AND TRADEMARK OFFICE
CERTIFICATE OF CORRECTION

PATENT NO. : 7,187,671 B2
APPLICATION NO. : 10/203087
DATED : March 6, 2007
INVENTOR(S) : Moyano et al.

It is certified that error appears in the above-identified patent and that said Letters Patent is hereby corrected as shown below:

In Column 31, Line 38, after "step" delete "St15c3" and insert -- ST15c3 --, therefor.

In Column 42, Line 24, in Claim 1, delete "multimedia controller" before "(MMC)".

In Column 43, Lines 28-29, in Claim 3, delete "multimedia controller" before "(MMC)".

In Column 43, Line 30, in Claim 3, after "in said" delete "multimedia controller".

In Column 43, Line 40, in Claim 4, after "according to" delete "any of".

In Column 44, Line 4, in Claim 7, after "according to" delete "any of".

In Column 44, Line 59, in Claim 10, after "according to" delete "any of".

Signed and Sealed this

Twentieth Day of May, 2008

JON W. DUDAS
*Director of the United States Patent and Trademark Office*